(12) United States Patent
Kojima et al.

(10) Patent No.: US 9,985,405 B2
(45) Date of Patent: May 29, 2018

(54) TERMINAL MANUFACTURING APPARATUS AND WELDING APPARATUS

(71) Applicants: Furukawa Electric Co., Ltd., Tokyo (JP); Furukawa Automotive Systems Inc., Shiga (JP)

(72) Inventors: Shinya Kojima, Tokyo (JP); Masaya Satou, Tokyo (JP); Takashi Shigematsu, Tokyo (JP); Saburo Yagi, Tokyo (JP); Kentarou Sakamoto, Shiga (JP); Mikio Kuwahara, Shiga (JP)

(73) Assignees: FURUKAWA AUTOMOTIVE SYSTEMS INC., Shiga (JP); FURUKAWA ELECTRIC CO., LTD., Tokyo (JP)

( * ) Notice: Subject to any disclaimer, the term of this patent is extended or adjusted under 35 U.S.C. 154(b) by 365 days.

(21) Appl. No.: 14/832,320

(22) Filed: Aug. 21, 2015

(65) Prior Publication Data

US 2015/0364891 A1    Dec. 17, 2015

Related U.S. Application Data

(63) Continuation of application No. PCT/JP2014/054390, filed on Feb. 24, 2014.

(30) Foreign Application Priority Data

Feb. 22, 2013 (JP) .................................. 2013-033921
Feb. 22, 2013 (JP) .................................. 2013-033922
(Continued)

(51) Int. Cl.
*H01R 43/00* (2006.01)
*B23K 26/262* (2014.01)
(Continued)

(52) U.S. Cl.
CPC ......... *H01R 43/16* (2013.01); *B23K 26/0093* (2013.01); *B23K 26/02* (2013.01);
(Continued)

(58) Field of Classification Search
CPC ............. Y10T 29/5197; Y10T 29/5198; Y10T 29/5143; Y10T 29/5193; Y10T 29/53235;
(Continued)

(56) References Cited

U.S. PATENT DOCUMENTS 3,229,357 A * 1/1966 Burstin .................. B21D 28/06
29/879
3,382,575 A * 5/1968 Gannoe .................. H01R 43/02
29/33 Q
(Continued)

FOREIGN PATENT DOCUMENTS

CN       1387288 A    12/2002
CN    102474057 A     5/2012
(Continued)

OTHER PUBLICATIONS

Office Action for CN Application 201480009855.9 dated Dec. 8, 2016.
(Continued)

*Primary Examiner* — Erica E Cadugan
(74) *Attorney, Agent, or Firm* — Thompson Coburn LLP

(57) ABSTRACT

A terminal manufacturing apparatus includes a pressing device adapted to form a chained terminal including a crimp portion by bending a continuously supplied plate-shaped workpiece into a hollow shape, the crimp portion being crimpable with a conductor part of a coated conductor accommodated therein, a welding device adapted to bring two edge portions of the crimp portion in proximity to each other and join the two edge portions by welding, a conveying/positioning time calculating unit adapted to determine a
(Continued)

conveying/positioning time of the welding device on the basis of a machining time required by the pressing device and the welding device, and a conveying/positioning mechanism adapted to position the chained terminal in a welding machining position within the welding device in accordance with the conveying/positioning time.

8 Claims, 17 Drawing Sheets

(30) Foreign Application Priority Data

| Feb. 22, 2013 | (JP) | ................................. | 2013-033923 |
| Feb. 22, 2013 | (JP) | ................................. | 2013-033924 |
| Feb. 22, 2013 | (JP) | ................................. | 2013-033960 |

(51) Int. Cl.

| B23K 26/244 | (2014.01) |
| B23K 26/70 | (2014.01) |
| B23K 101/06 | (2006.01) |
| H01R 43/16 | (2006.01) |
| B23K 26/00 | (2014.01) |
| B23K 26/08 | (2014.01) |
| B23K 26/32 | (2014.01) |
| B23K 26/0622 | (2014.01) |
| B23K 26/02 | (2014.01) |
| B23K 26/20 | (2014.01) |
| H01R 43/02 | (2006.01) |
| H01R 43/048 | (2006.01) |
| H01R 4/18 | (2006.01) |
| B23K 101/16 | (2006.01) |
| B23K 101/38 | (2006.01) |
| B23K 103/12 | (2006.01) |
| B23K 103/10 | (2006.01) |

(52) U.S. Cl.
CPC ...... *B23K 26/0622* (2015.10); *B23K 26/0846* (2013.01); *B23K 26/20* (2013.01); *B23K 26/262* (2015.10); *B23K 26/32* (2013.01); *H01R 43/0221* (2013.01); *H01R 43/048* (2013.01); *B23K 2201/16* (2013.01); *B23K 2201/38* (2013.01); *B23K 2203/10* (2013.01); *B23K 2203/12* (2013.01); *H01R 4/187* (2013.01); *H01R 2201/26* (2013.01); *Y10T 29/5116* (2015.01); *Y10T 29/5143* (2015.01); *Y10T 29/5193* (2015.01); *Y10T 29/5197* (2015.01); *Y10T 29/5198* (2015.01); *Y10T 29/53235* (2015.01)

(58) Field of Classification Search
CPC ............... Y10T 29/49204–29/49224; Y10T 29/53209–29/53239; H01R 43/0221; H01R 43/16; H01R 43/048; B23K 2201/38
USPC ......... 29/33 Q, 33 S, 564.7, 33 M, 874–885, 29/747–754
See application file for complete search history.

(56) References Cited

U.S. PATENT DOCUMENTS

| 4,466,689 | A | | 8/1984 | Davis et al. |
| 5,814,787 | A | | 9/1998 | Nishibayashi et al. |
| 9,120,191 | B2 | * | 9/2015 | Karasawa ............ B21D 53/022 |
| 9,564,691 | B2 | * | 2/2017 | Yagi ..................... B23K 26/24 |
| 2001/0003687 | A1 | | 6/2001 | Kondo |
| 2011/0232076 | A1 | * | 9/2011 | Matsubara ............ B21D 28/02 |
| | | | | 29/564 |
| 2012/0135648 | A1 | | 5/2012 | Morikawa |
| 2012/0222293 | A1 | * | 9/2012 | Ueda .................... B21D 53/022 |
| | | | | 29/727 |

FOREIGN PATENT DOCUMENTS

| CN | 102856760 A | | 1/2013 |
| JP | H03-009294 U | | 1/1991 |
| JP | 07-012753 A | * | 1/1995 |
| JP | 07-320844 A | * | 12/1995 |
| JP | 08-220403 A | * | 8/1996 |
| JP | H10-328862 A | | 12/1998 |
| JP | 2001-167821 A | * | 6/2001 |
| JP | 2004-071437 A | * | 3/2004 |
| JP | 2011-34772 A | | 2/2011 |
| JP | 2012-069449 A | * | 4/2012 |
| JP | 2014-187047 A | * | 10/2014 |
| WO | 94/16838 A1 | | 8/1994 |
| WO | WO-2004/129640 A1 | * | 8/2014 |

OTHER PUBLICATIONS

English translation of Written Opinion for PCT/JP2014/054390 dated May 13, 2014.
English translation of International Preliminary Report on Patentability (Chapter I) for PCT/JP2014/054390 dated Aug. 25, 2015.
International Search Report and Written Opinion dated May 13, 2014 for PCT/JP2014/054390.
Decision to Grant a Patent dated Jun. 9, 2014 for Japanese Patent Application No. 2014-512568.
Decision to Grant a Patent in corresponding JP Divisional Application No. 2014-136620 dated Sep. 25, 2017.
Office Action in corresponding Chinese Application No. 201480009855.9 dated Jul. 18, 2017.
Notification for Granting an Invention Patent dated Jan. 30, 2018 in the corresponding Chinese Application No. 201480009855.9.

* cited by examiner

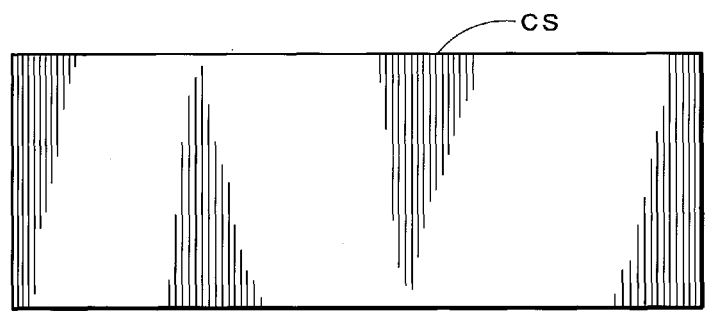
F I G. 2 A
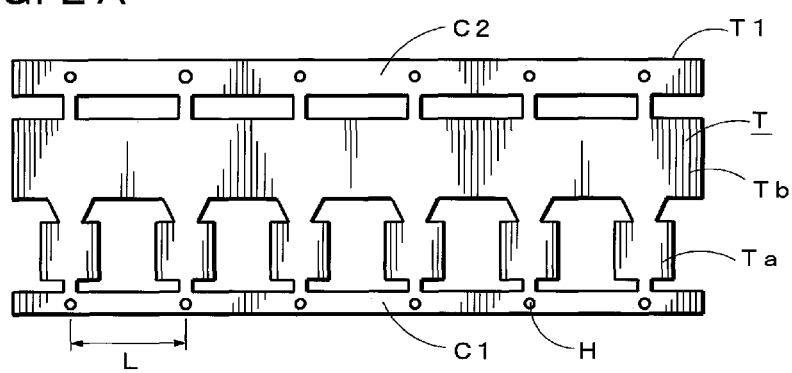
F I G. 2 B
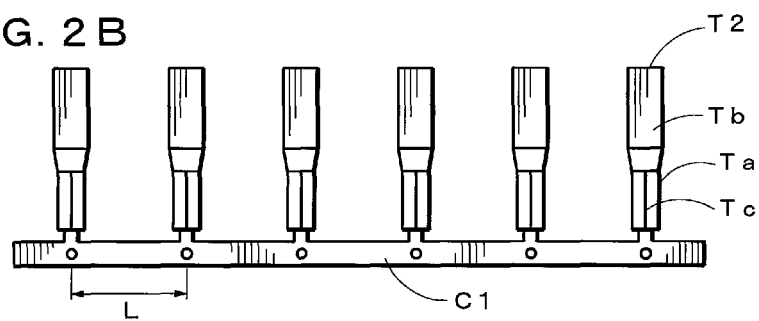
F I G. 2 C
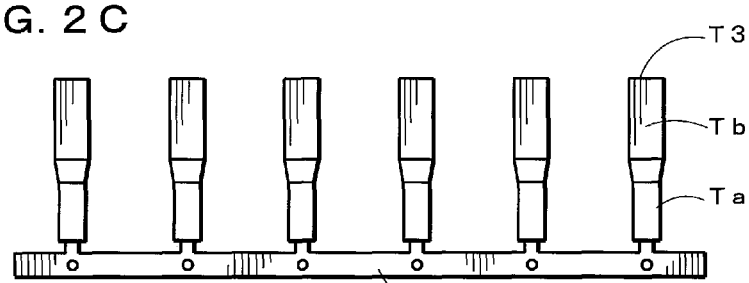
F I G. 2 D

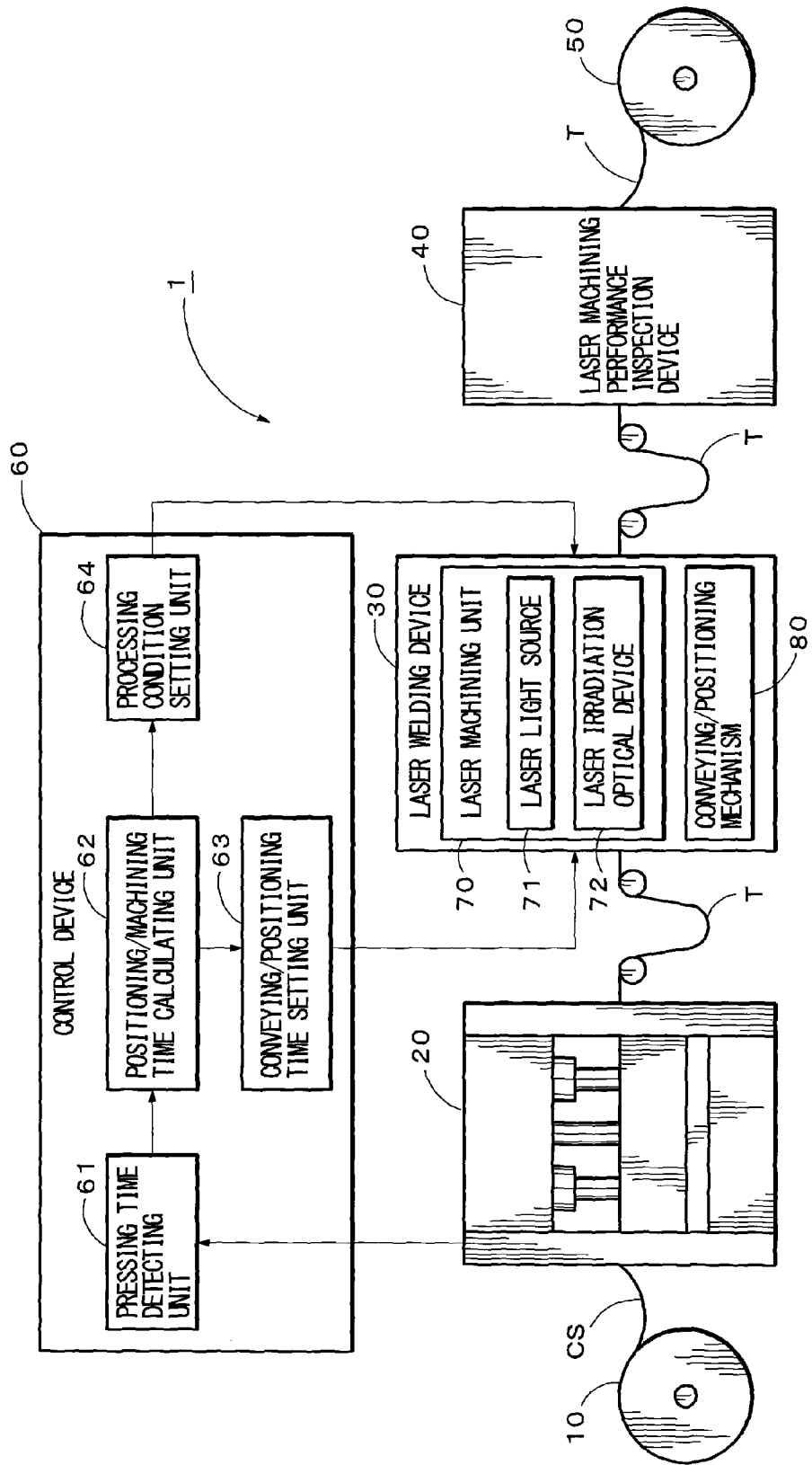
F I G. 4

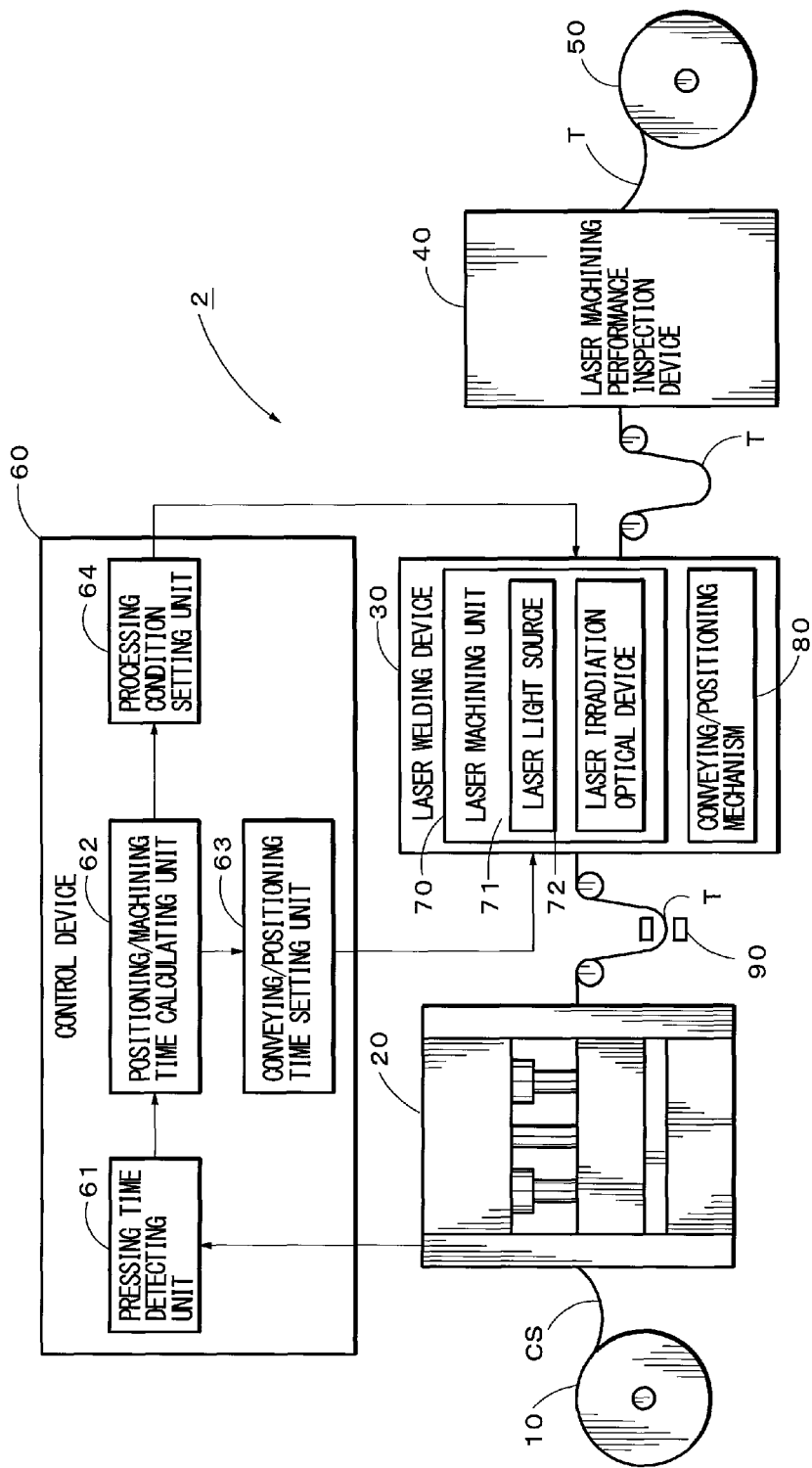
F I G. 5

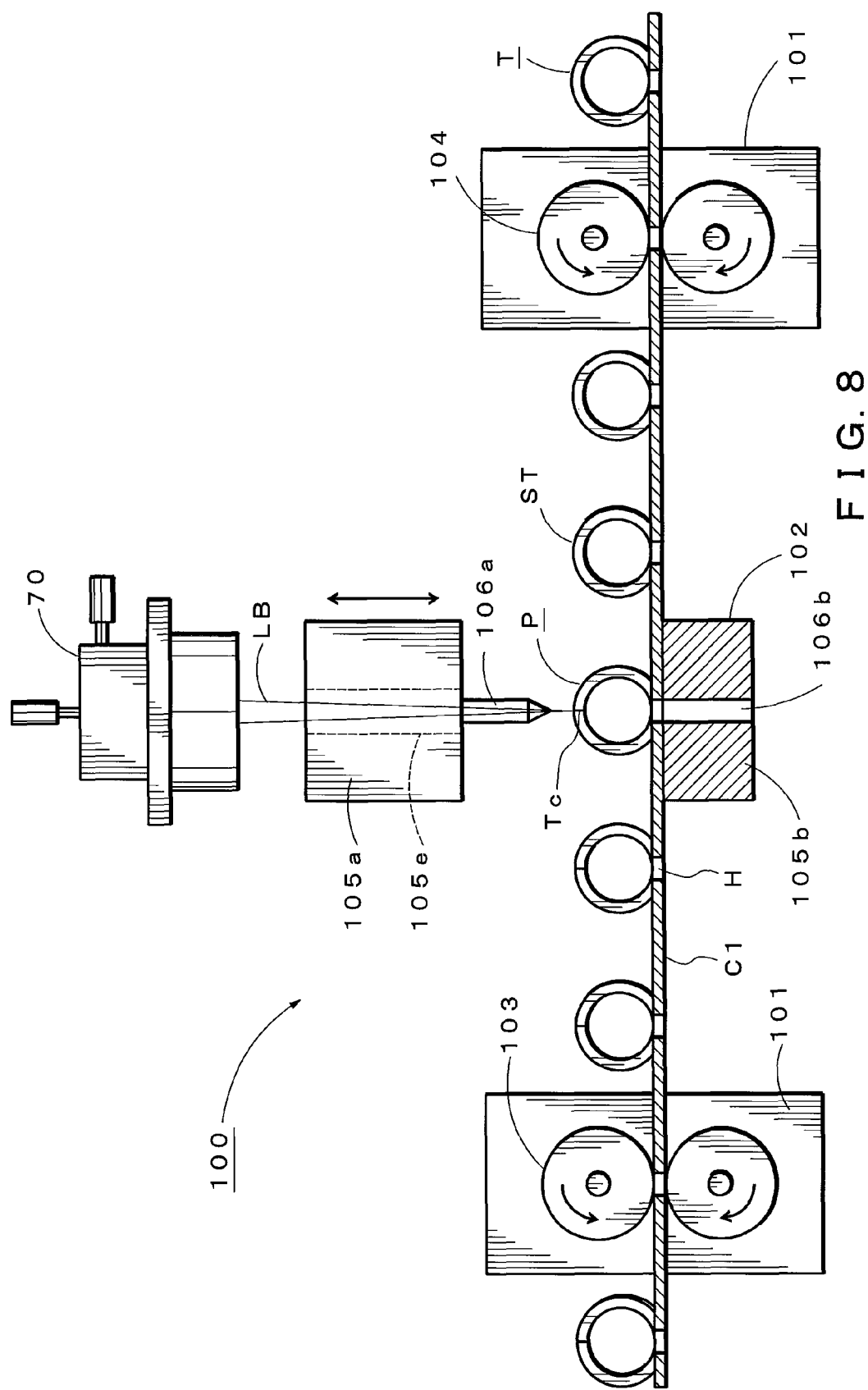

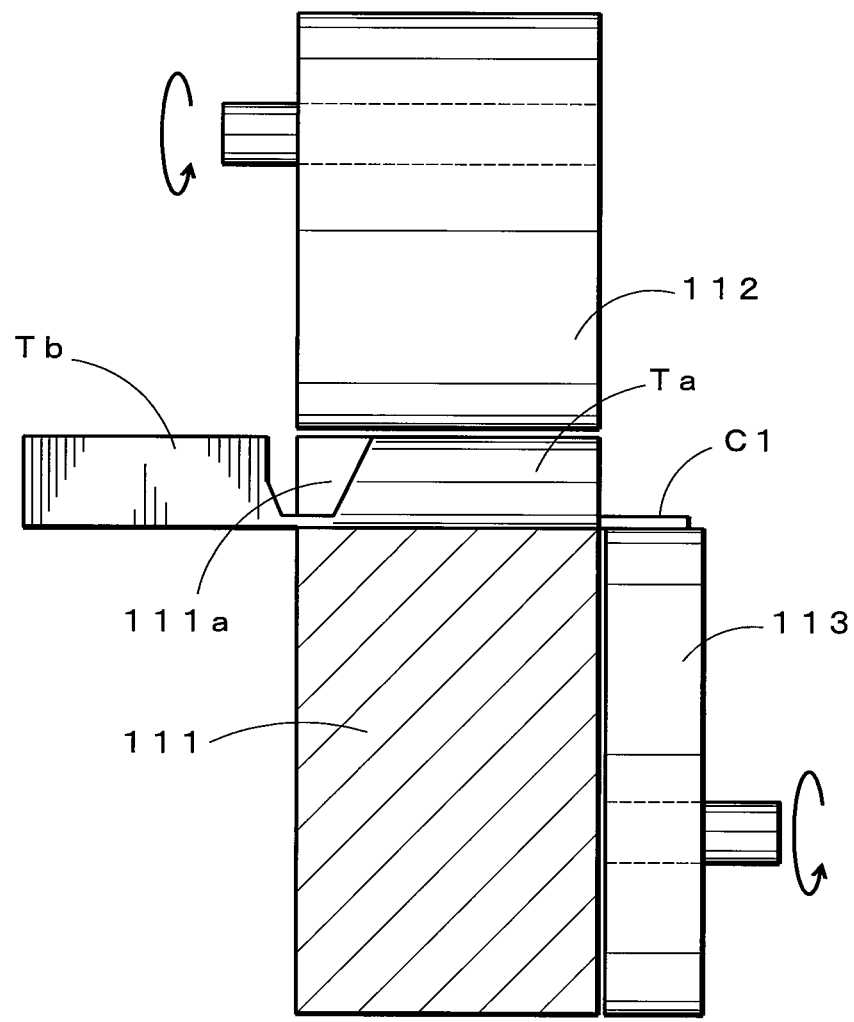
F I G. 11

TERMINAL MANUFACTURING APPARATUS AND WELDING APPARATUS

CROSS REFERENCE TO RELATED APPLICATIONS

This is a continuation application of International Patent Application No. PCT/JP2014/054390 filed Feb. 24, 2014, which claims the benefit of Japanese Patent Application Nos. 2013-033921, 2013-033922, 2013-033923, 2013-033924 and 2013-033960, all filed Feb. 22, 2013, the full contents of all of which are hereby incorporated by reference in their entirety.

BACKGROUND

Technical Field

The present disclosure relates to a welding apparatus adapted to weld a butted interface or an overlapping part of a workpiece using laser irradiation, and a terminal manufacturing apparatus including the welding apparatus.

Background Art

Wire harnesses are often used for internal wiring of automobiles. A wire harness is a module in which a plurality of coated wires are assembled in accordance with in-vehicle wiring specifications. Terminals for connection (hereinafter referred to as crimp terminals) are crimped to ends of each of the coated wires. When connecting a crimp terminal to a wire end of the wire harness, electrical connection between the wire end and the crimp terminal is provided by stripping the insulating coating layer at a wire end to expose the core wire, and swaging and crimping a core wire barrel of the crimp terminal to the exposed portion of the core wire. The connecting portion between the crimp terminal and the wire end is sealed with resin so as to prevent corrosion of the core wire due to ingress of moisture into the wire from the connecting portion (see Japanese Laid-Open Patent Publication No. 2001-167821 and Japanese Laid-Open Patent Publication No. 2012-069449, for example).

Further, this type of crimp terminal is manufactured by, for example, performing press molding such as punching and bending using a pressing device on a copper strip that is supplied by a conveyance device from a condition of being wound up into a roll shape. During the press molding, a chain-form chained terminal connected by carriers that are held by a conveyance mechanism is formed in order to convey the copper strip through the device. The chained terminal is then wound up into a roll shape again, whereupon the connection portion between the crimp terminal formed in a terminal shape and the electric wire terminal is typically sealed by resin in a resin sealing device.

However, the resin seal formed in the connection portion between the crimp terminal and the electric wire terminal gives rise to an increase in the manufacturing cost of the wire harness. This is because, in addition to the fact that the resin used is expensive in itself, time is required to apply and cure the resin in a resin molding process or a coating process.

Therefore, attempts have been made to obtain a sealed structure for the wire connection portion (the crimp portion) of the crimp terminal with by bending the wire connection portion into a tubular shape by press molding, and joining an entire butted interface between respective plate material ends, which is formed at the tubular shaped bent part by laser welding.

Meanwhile, during the process for manufacturing the crimp terminal, the press-molded chained terminal needs to be wound up and then transported to the subsequent laser welding process. The winding operation causes an increase in a number of operation processes, and moreover, causes deformation of the terminal while being wound up and the terminal becomes no longer horizontal or vertical relative to the carrier, and thus affects the quality of the laser welding performed in the subsequent process.

The present disclosure is firstly related to providing a terminal manufacturing apparatus in which a press-molded chained terminal can be conveyed to a subsequent laser welding process without being wound up, leading to improvements in welding quality and manufacturing speed.

The present disclosure is secondly related to providing a welding apparatus having a conveying/positioning mechanism that is capable of conveying a chained terminal that is being supplied after the press molding to a subsequent laser welding process without winding it up such that the laser welding can be performed while ensuring a conveyance speed and a positioning precision.

The present disclosure is thirdly related to provide a terminal manufacturing apparatus in which a press-molded workpiece is conveyed to a subsequent laser welding process so as to achieve improvements in welding quality and manufacturing speed.

SUMMARY

According to a first aspect of the invention, a terminal manufacturing apparatus according to the present disclosure includes: a pressing device adapted to form a chained terminal including a crimp portion by bending a continuously supplied plate-shaped workpiece into a hollow shape, the crimp portion being crimpable with a conductor part of a coated conductor accommodated therein; a welding device adapted to bring two edge portions of the crimp portion in proximity to each other and join the two edge portions by laser welding; a conveying/positioning time calculating unit adapted to determine a conveying/positioning time of the welding device on the basis of a machining time required by the pressing device and the welding device; and a conveying/positioning mechanism adapted to position the chained terminal in a welding position within the welding device in accordance with the conveying/positioning time.

According to this aspect, after the pressing, the chained terminal can be laser welded without being wound up, and therefore deformation of the terminal due to the winding up does not occur. As a result, high welding quality can be maintained. Further, the pressing and the laser welding can be performed on a single line rather than separate lines, and therefore a terminal manufacturing speed can be increased. Furthermore, the machining time required by the pressing device and the welding device and the conveying/positioning time are determined, and therefore a processing time of the pressing device and a processing time of the welding device can be synchronized. As a result, the separate pressing and laser welding processes can be connected smoothly.

Further, in the aforementioned terminal manufacturing apparatus, the machining time includes a pressing time required by the pressing device, a conveying/positioning time required to convey the chained terminal to the welding position in which welding is performed on the crimp portion and to position the chained terminal in the position and release the chained terminal from the position, and a welding time required by the welding device, and the conveying/positioning time calculating unit determines the conveying/positioning time such that the pressing time is equal to a sum of the welding time and the conveying/positioning time.

Accordingly, as a specific technique for determining the conveying/positioning time required to synchronize the pressing time of the pressing device with the welding time of the welding device, the machining time is divided into the pressing time, the welding time, and the terminal conveying time and positioning time, and thereafter the conveying/positioning time is calculated such that the pressing time is equal to a sum of the welding time and the conveying/positioning time. In this case, even if the welding time is determined in advance in accordance with a plate thickness of the terminal, a welding precision, and so on, the conveying time and the positioning time can be adjusted.

Further, in the aforementioned terminal manufacturing apparatus, a position detection sensor adapted to detect a sag amount of the conveyed chained terminal is provided on a conveyance path of the chained terminal between the pressing device and the welding device, and the conveying/positioning time calculating unit corrects the conveying/positioning time in accordance with the sag amount. Accordingly, a deviation between respective conveyance speeds of the pressing device and the welding device can be detected on the basis of the sag amount of the chained terminal between the pressing device and the welding device, and the conveying/positioning mechanism can correct the conveying/positioning time of the welding device on the basis thereof. As a result, the pressing time and the welding time can be synchronized more accurately.

Further, in the aforementioned terminal manufacturing apparatus, the machining time further includes a standby time used in performing a time adjustment, the position detection sensor detects a positional deviation of the chained terminal in a vertical direction from a horizontal position serving as a reference; in a case where the chained terminal deviates upward in the vertical direction, determining that the welding time is short, the conveying/positioning time calculating unit performs a process of lengthening the standby time; and in a case where the chained terminal deviates downward in the vertical direction, determining that the welding time is long, the conveying/positioning time calculating unit performs a process of shortening the standby time.

Accordingly, as a specific unit for correcting the processing time of the pressing device and the processing time of the welding device, when the sag protrudes upward or downward in the vertical direction, the welding time of the welding device is determined to be short or long, and the conveying/positioning time is corrected accordingly. As a result, the pressing time and the welding time can be synchronized more accurately.

A machining performance inspection device adapted to inspects a machining performance in relation to the laser welded crimp portion may be provided integrally with the welding device or on a downstream side of the welding device. By providing the machining performance inspection device on the downstream side of the welding device and inspecting the welding performance, it is possible to perform the pressing, the welding, and the machining performance inspection together in a single process, and as a result, a terminal manufacturing apparatus having a high terminal manufacturing speed can be provided.

Further, in the aforementioned terminal manufacturing apparatus, the pressing time is calculated from a pressing interval, which is detected from a shot counter of the pressing device.

Further, in the aforementioned terminal manufacturing apparatus, a machining performance inspection device adapted to inspect a machining performance in relation to the welded crimp portion is provided integrally with the welding device or separately to the welding device on a downstream side thereof.

According to a second aspect of the present disclosure, a welding apparatus according to the present disclosure includes: a conveying unit adapted to conveys a chained terminal, which is formed from a crimp terminal having a crimp portion that is formed by being bent into a hollow shape and a carrier portion supporting a plurality of the crimp terminals at fixed intervals, while holding the carrier portion; a positioning unit adapted to position the crimp terminal conveyed by the conveying unit in a welding machining position; and a welding unit adapted to join two bent edge portions of the crimp portion of the positioned crimp terminal by laser welding, wherein the positioning portion includes: a holding mechanism adapted to position the crimp terminal in the welding machining position by sandwiching the crimp terminal from an orthogonal direction to a conveyance direction; and a clamping mechanism adapted to implement positioning in which a pin provided on the holding mechanism is inserted into a hole provided in the carrier portion Further, in the aforementioned welding apparatus, by conveying the chained terminal using the conveying unit, the crimp terminal can be conveyed to the welding machining position at high speed and with a high degree of precision. Further, positioning in the welding machining position can be performed even more precisely by having the clamping mechanism position the hole provided in the carrier portion using the pin and having the holding mechanism sandwich the crimp terminal from the upper and lower surfaces thereof. As a result, laser welding can be performed reliably on the two edge portions of the crimp portion of the crimp terminal, and therefore a manufacturing apparatus exhibiting high yield can be provided.

Further, in the aforementioned welding apparatus, the holding mechanism includes an upper clamping jig and a lower clamping jig for sandwiching the crimp terminal from the orthogonal direction to the conveyance direction, a penetrating groove is provided in the upper clamping jig so that the two bent edge portions of the crimp portion can be laser welded by the welding unit, and the welding unit performs the laser welding on the crimp portion through the penetrating groove.

Accordingly, the crimp terminal can be sandwiched from the upper and lower surfaces thereof by the clamping jigs in the welding machining position. Moreover, since the clamping jig is provided with the penetrating groove through which the laser welding is performed, the laser welding can be performed while holding the crimp terminal with the clamping jigs.

Further, in the aforementioned welding apparatus, the conveying unit includes a pair of rollers provided respectively on an upstream side and a downstream side of the welding unit so as to contact respective surfaces of the carrier portion on the respective sides, and the crimp terminal is conveyed to the welding machining position by rotating the rollers.

Accordingly, the chained terminal can be conveyed while holding the carrier portion reliably using the rollers, and therefore the chained terminal can be conveyed at high speed while maintaining a high degree of positioning precision.

According to a third aspect of the present disclosure, a terminal manufacturing apparatus includes: a pressing device adapted to form, on a continuously supplied plate-shaped workpiece, a butted portion between respective ends of a plate material bent to have a hollow cross-section and a lapped portion in which one end of the plate material is squeezed into a flat plate shape; a welding device adapted to join the butted portion and the lapped portion by welding; and a welding inspection device adapted to measure a bead width of the welded butted portion and lapped portion.

According to this aspect, by conveying the press-molded workpiece to the subsequent laser welding process and measuring the bead width of the welded butted portion and lapped portion, improvements in welding quality and manufacturing speed can be achieved.

According to the first aspect described above, it is possible to provide a terminal manufacturing apparatus in which a press-molded chained terminal can be conveyed to a subsequent laser welding process without being wound up, leading to improvements in welding quality and manufacturing speed.

According to the second aspect described above, it is possible to provide a welding apparatus having a conveying/positioning mechanism that is capable of conveying a chained terminal conveyed following press molding to a subsequent laser welding process without being wound up so that the laser welding is performed after securing sufficient conveyance speed and positioning precision.

According to the third aspect described above, it is possible to provide a terminal manufacturing apparatus in which a press-molded workpiece is conveyed to a subsequent laser welding process such that improvements in welding quality and manufacturing speed are achieved.

BRIEF DESCRIPTION OF DRAWINGS

FIGS. 2A to 2D are schematic diagrams showing processes for manufacturing a crimp terminal according to the first embodiment of the present disclosure.

FIG. 4 is a view showing the configuration of the terminal manufacturing apparatus according to the first embodiment of the present disclosure.

FIG. 5 is a view showing a configuration of a terminal manufacturing apparatus according to a second embodiment of the present disclosure.

FIG. 8 is a schematic diagram showing an example of a conveying/positioning mechanism used in a laser welding device according to an embodiment of the present disclosure.

FIG. 11 is a side view of the positioning mechanism shown in FIG. 10.

DETAILED DESCRIPTION

Figure 1:
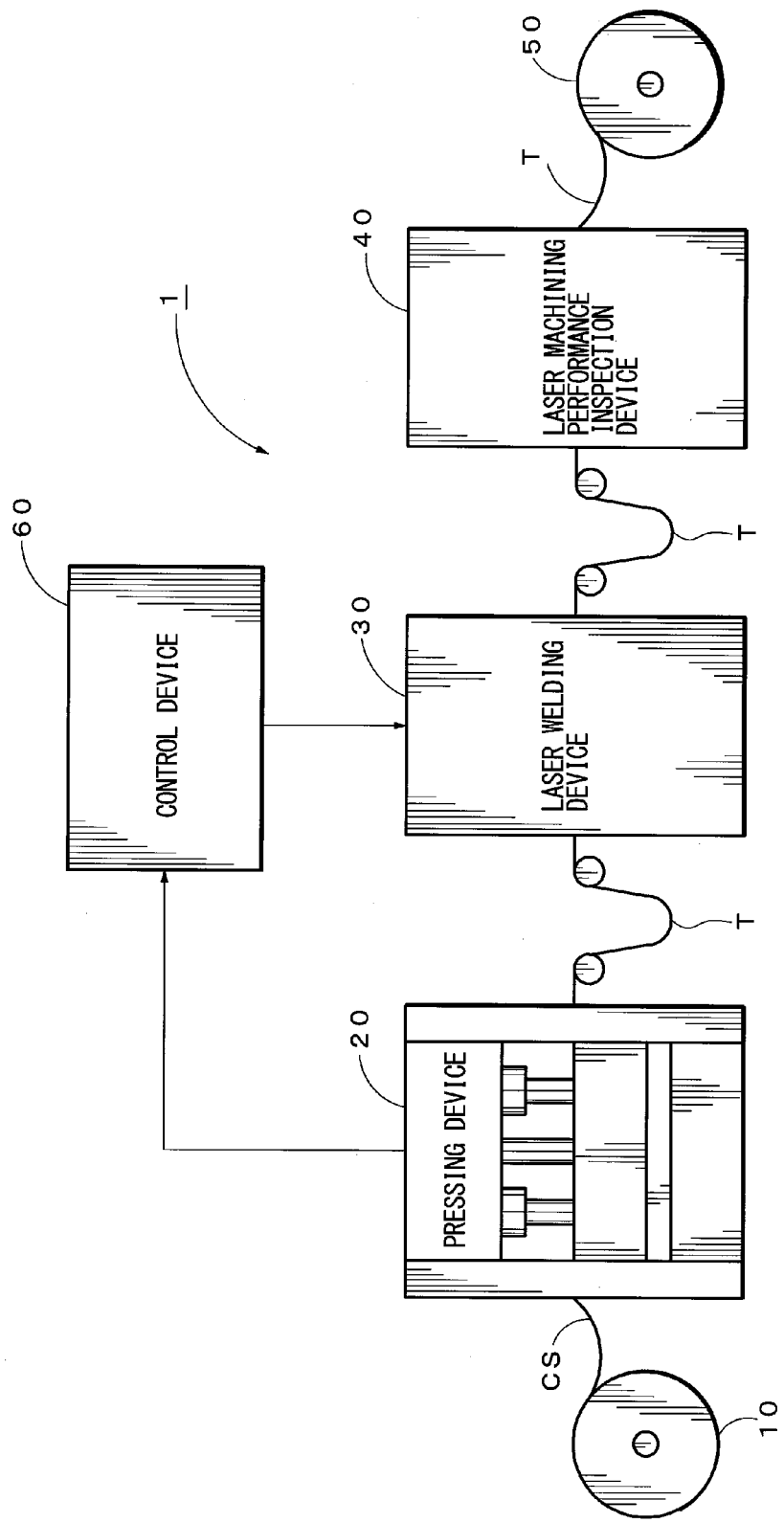
FIG. 1 is a schematic view showing a configuration of a terminal manufacturing apparatus according to a first embodiment of the present disclosure.

Hereinafter, embodiments of the present disclosure will be described while referring to the drawings in relation to each embodiment.

1. First Embodiment

A terminal manufacturing apparatus 1 according to a first embodiment of the present disclosure will now be described with reference to FIGS. 1 to 4.

[1-1. Configuration]

First, an outline of the configuration of the terminal manufacturing apparatus 1 according to the present embodiment will be described. As shown in FIG. 1, the terminal manufacturing apparatus 1 includes, from an upstream side of a conveyance direction on a left side of the drawing, an unwinding roller 10, a pressing device 20, a laser welding device 30, a laser machining performance inspection device 40, a winding roller 50, and a control device 60 that controls operations thereof.

In the related art, the pressing device 20 and the laser welding device 30 are employed in separate processes such that a workpiece subjected to press molding is wound up into a roll shape, transported to a subsequent process (in the related art, a resin sealing process), and then unwound in preparation for the subsequent process. The terminal manufacturing apparatus 1 according the embodiment of the present embodiment, on the other hand, performs press molding and a subsequent process (in the present embodiment, laser welding) as a series of processes.

Note that, from the foregoing, the laser machining performance inspection device 40 is not an essential element in the embodiment of the present disclosure. Further, an example in which the pressing device 20 and the laser welding device 30 are provided separately will be described in the embodiment of the present disclosure. However, the present disclosure also includes an embodiment in which the pressing device 20 and the laser welding device 30 are provided integrally, or in other words in which the laser welding device 30 is incorporated into the pressing device 20. Further, an example in which the laser welding device 30 and the laser machining performance inspection device 40 are configured as separate devices is shown for ease of description, but the present disclosure also includes an embodiment in which the functions of the laser machining performance inspection device 40 are incorporated into the laser welding device 30.

The respective components of the terminal manufacturing apparatus 1 will now be described.

The unwinding roller 10 is a mechanism for unwinding and supplying a copper strip CS, which is as a workpiece wound into a roll shape, at a predetermined speed. The unwinding roller 10 conveys the copper strip CS from the roll continuously at a speed that is determined based mainly on the pressing timing of the pressing device 20.

In the present embodiment, a plate material formed from a copper alloy is used as the copper strip CS. Note that the material of the workpiece is of course not limited to a copper alloy, and an aluminum-based material, for example, may also be used as the workpiece. In the present embodiment, a workpiece having a plate thickness of 0.25 mm or 0.32 mm is used. Needless to mention, however, the plate thickness is not limited thereto.

As will be described below, the copper strip CS is conveyed intermittently through the pressing device 20 in accordance with the pressing timing. Therefore, as shown in FIG. 1, the copper strip CS is caused to sag by a fixed amount between the unwinding roller 10 and the pressing device 20 in order to absorb a conveyance timing difference between intermittent conveyance and continuous conveyance.

The pressing device 20 is an apparatus that performs press molding such as punching and bending on the copper strip CS supplied from the unwinding roller 10 while intermittently conveying the copper strip CS by a conveyance mechanism, not shown in the drawing to form a chained terminal T.

More specifically, as shown in FIGS. 2A to 2D, by implementing punching as primary pressing on the copper strip CS (FIG. 2A) unwound from the roll shape, a chained terminal T1 shown in FIG. 2B is formed. The chained terminal T1 is provided with upper and lower carrier portions C1, C2 for conveying the chained terminal T1 in a conveyance direction through the pressing device 20. A plurality of holes H into which pins, not shown in the drawings, are inserted in order to perform positioning during conveyance are provided in the carrier portions C1, C2 at a predetermined pitch (here, one hole each for each position of crimp terminals ST). Parts forming tubular crimp portions Ta of individual crimp terminals ST in a subsequent process and box-shaped connector portions Tb serving as connection parts to other terminals are formed between the carrier portions C1, C2.

Figure 3:
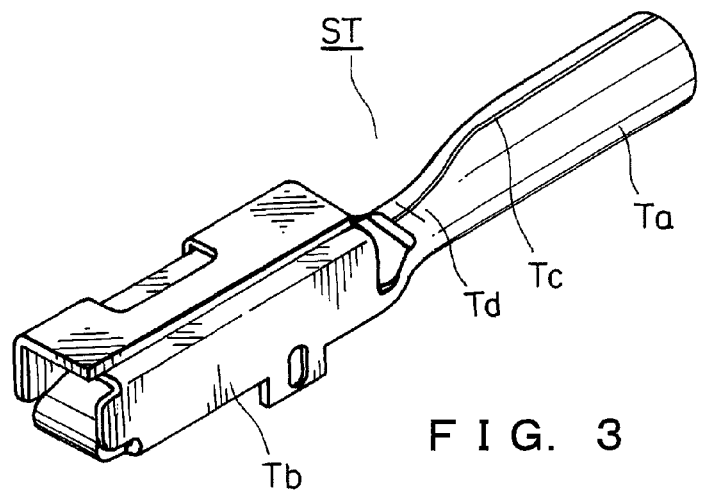
FIG. 3 is a perspective view showing an outer configuration of a crimp terminal manufactured using the processes shown in FIGS. 2A to 2D.

In FIG. 2C, a chained terminal T2 shown in FIG. 2C is formed by implementing bending as secondary pressing. In the chained terminal T2, the carrier portion C2 is removed such that only the carrier portion C1 remains. Further, as shown in FIG. 3, the crimp portion Ta and the connector portion Tb are bent into a tubular shape and a box shape, respectively. In this condition, a butted interface Tc is formed in the part of the crimp portion Ta bent into a tubular shape. Note that the outer shape of the crimp portion Ta may be bent in a tubular shape having a step on a surface thereof. In other words, the crimp portion Ta may be formed with a stepped pipe structure.

The laser welding device 30 is a device for forming a wire connecting portion by joining the butted interface Tc formed in the bent part of the crimp terminal ST by laser welding. More specifically, as shown by the image in the perspective view of FIG. 3, laser welding is performed on the butted interface Tc formed to extend in an axial direction in an upper end portion of the crimp portion Ta of the crimp terminal ST, which is bent into a cylindrical shape. Further, a connecting part of the crimp portion Ta that connects to the connector portion Tb is squeezed to form the connecting portion Tc, and this part is sealed by laser welding to prevent water infiltration into a conductive part. Note that in the example employed here, the bent part of the crimp terminal ST is abutted, but according to the present embodiment, a joint can be formed by laser welding likewise in a case where the bent part is overlapped.

Fiber laser welding is used as the laser welding performed by the laser welding device 30. Due to its excellent beam quality and high light-collecting properties, a fiber laser can realize laser welding of higher energy density in a machining range, compared to a laser of the related art. Accordingly, a material can be processed at high speed with little thermal effect, enabling deep fillet welding at a high aspect ratio. As a result, the butted interface Tc constituted by two edge portions can be sealed appropriately while suppressing strength reduction and deformation of the crimp portion Ta. The fiber laser may be emitted by continuous wave oscillation, pulsed oscillation, QCW oscillation, or pulse-controlled continuous wave oscillation. The fiber laser may be a single mode or a multi-mode fiber laser.

Note that in the present disclosure, a laser beam such as a YAG laser, a semiconductor laser, or a disc laser, or an electron beam may be used instead of fiber laser welding.

The laser machining performance inspection device 40 is a device that inspects the machining performance on the laser welded chained terminal T. More specifically, the laser machining performance inspection device 40 inspects a welding result achieved by the laser welding device 30 on the laser welded butted interface Tc by determining whether or not an amount of axial direction positional deviation of a welding position and a bead width are within allowable ranges using an image capturing unit such as a CCD camera.

Note that the chained terminal T is conveyed along a conveyance path between the pressing device 20 and the laser welding device 30 while being allowed to sag. Similarly, the chained terminal T is conveyed along a conveyance path between the laser welding device 30 and the laser machining performance inspection device 40 while being allowed to sag. The reason for this is that deviations occur between the processing timings of the pressing device 20 and the laser welding device 30 and between the processing timings of the laser welding device 30 and the laser machining performance inspection device 40, and by allowing the chained terminal T to sag between processes, these deviations are absorbed.

The winding roller 50 is a mechanism that winds up the chained terminal T at a similar speed to the unwinding roller 10. Note that with regard to the winding roller 50, similarly to the unwinding roller 10, the chained terminal T is conveyed through the laser welding device 30 or the laser machining performance inspection device 40 constituting the previous process intermittently in accordance with the timing of the laser machining or the inspection processing. Therefore, as shown in FIG. 1, the chained terminal T is caused to sag by a fixed amount between the winding roller 50 and the laser machining performance inspection device 40 in order to absorb a conveyance timing difference between intermittent conveyance and continuous conveyance.

As described above, an example in which the laser welding device 30 and the laser machining performance inspection device 40 are configured as separate devices is shown for ease of description, but the functions of the laser machining performance inspection device 40 may be incorporated into the laser welding device 30. In other words, the functions of the laser machining performance inspection device 40 may be realized by providing an image inspection camera in the laser welding device 30 on the conveyance path of the chained terminal T on a downstream side of a laser machining portion 70.

The control device 60 mainly controls operations of the laser welding device 30 so that the press molding of the pressing device 20 and the laser machining of the laser welding device 30 are implemented as a series of processes.

[1-2. Specific Configurations of Laser Welding Device and Control Device]

To implement the press molding of the pressing device 20 and the laser machining of the laser welding device 30 as a series of processes, as described above, the laser welding device 30 and the control device 60 have the following specific configurations, as shown in FIG. 4.

First, the laser welding device 30 includes a laser light source 71 and a laser irradiation optical device 72, which together constitute the laser machining unit 70, and a conveying/positioning mechanism 80.

The laser light source 71 is a conventional fiber laser, in which a rare earth-doped silica optical fiber is used as a laser medium to oscillate a laser beam having a wavelength in the infrared region. The laser irradiation optical device 72 is an optical device for guiding a laser beam output from the laser light source 71 to the crimp terminal ST, and in the present embodiment, a galvanometer scanner is used. Here, the galvanometer scanner is a biaxial (XY) galvanometer scanner in which a laser beam from an optical path axis shifting optical device 72 is reflected successively by two mirrors that are angle-controlled synchronously about mutually orthogonal axes, whereby the laser beam is swept and irradiated on the butted interface Tc of the crimp terminal ST, which is stopped in a laser machining position.

Note that in the laser welding device 30 according to the present embodiment, as described above, a sealing portion Td may be formed on the crimp portion Ta not only by joining the butted interface Tc where the respective ends of the plate material bent into a tubular shape abut using laser welding or the like, but also by forming a lapped portion in which one end of the plate material bent into a tubular shape overlaps an end portion on the connector portion Tb side in planar form, and performing laser welding on the lapped portion. More specifically, the sealing portion Td is formed by performing welding in a terminal width direction on a lapped portion formed by overlapping one end of a single plate material in planar form, or in other words formed by apparently two overlapping plate materials, midway in a longitudinal direction.

Further, the laser light source 71 is not limited to the fiber laser described above, it is also possible to use a laser machining head and move the laser machining head itself in an XY direction (the horizontal direction) to thereby sweep a laser beam LB.

The conveying/positioning mechanism 80 includes a mechanism for supplying the respective crimp terminals ST arranged on the chained terminal T to the welding machining position in succession by either conveying the chained terminal T intermittently at a constant pitch corresponding to a pitch L of the crimp terminals ST or conveying the chained terminal T continuously at a predetermined speed. Note that specific examples of the conveying/positioning mechanism 80 (including conveying/positioning mechanisms 100, 110, 120) will be described below.

The control device 60 includes pressing time detecting unit 61, conveying/positioning/machining time calculating unit 62, conveying/positioning time setting unit 63, and machining condition setting unit 64.

The pressing time detecting unit 61 detects a time required by the pressing device 20 to perform a punching or bending process on a single crimp terminal ST. More specifically, a pressing interval is detected from a shot counter, not shown in the drawings, provided in the pressing device 20, and the pressing interval is calculated as the pressing time. Note that the pressing time detecting unit 61 is not limited to calculating the pressing time using a shot counter, and may, for example, detect a pressing speed (spm) by calculating a motor rotation speed (rpm), and calculate the pressing speed as the pressing time.

The positioning/machining time calculating unit 62 calculates an index time extending from a point at which laser welding is completed, after the conveying/positioning mechanism 80 conveys one of the crimp terminals ST of the chained terminal T to the welding machining position and laser welding is performed on this crimp terminal ST, to a point at which the next crimp terminal ST to be welded is conveyed to and positioned in the welding machining position (i.e., a sum of a conveyance time and a positioning time), and a time (referred to hereafter simply as a "laser machining time") required to perform laser welding on a single crimp terminal ST. Note that in the example described above, the crimp terminals ST conveyed to the welding machining position are conveyed and processed one at a time, but here, a plurality of crimp terminals ST may be conveyed, positioned, and subjected to the welding machining at once.

More specifically, the positioning/machining time calculating unit 62 reads the pressing time specified by the pressing time detecting unit 61 and the laser machining time, and determines the index time required by the conveying/positioning mechanism 80 on the basis of the read times. In other words, the positioning/machining time calculating unit 62 performs processes of setting the pressing time at an approximately maximum time, subtracting the laser machining time from this time, and allocating timings of three times, namely (1) the conveyance time for conveying the crimp terminal ST to the welding machining position, (2) a positioning time for positioning the crimp terminal ST in the welding machining position, and (3) a positioning release time for releasing the crimp terminal ST from the welding machining position, within the remaining time.

The conveying/positioning time setting unit 63 sets the conveying/positioning time calculated as described above in relation to the conveying/positioning mechanism 80. The conveying/positioning mechanism 80 is controlled on the basis of the set time. Further, the machining condition setting unit 64 inputs the laser machining time into the laser welding device 30. The laser welding device 30 is controlled on the basis of the set time.

[1-3. Effects]

According to the present embodiment described above, since laser welding can be performed on the pressed chained terminal T without winding the chained terminal T up, and therefore deformation of the crimp terminals ST due to the winding up of the chained terminal T can be avoided, high welding quality can be maintained.

Further, pressing and laser welding can be performed on a single line rather than separate lines, and therefore the speed at which the crimp terminals ST are manufactured can be increased. Furthermore, the welding time and the conveying/positioning time employed in the laser welding device 30 are determined on the basis of the pressing time, and therefore the processing time of the pressing device 20 and the processing time of the laser welding device 30 can be synchronized. As a result, the pressing process and the laser welding process, which are separate processes, can be connected smoothly.

Moreover, as a specific technique for determining the conveying/positioning time required to synchronize the processing time of the pressing device 20 and the processing time of the laser welding device 30, the machining time is divided into the pressing time, the welding time, and the terminal conveying time and positioning time, and thereafter, the conveying/positioning time is calculated such that the pressing time is equal to a sum of the welding time and the conveying/positioning time. In this case, even when the welding time is determined in advance in accordance with the plate thickness of the terminal, the welding precision, and so on, the conveying time and the positioning time can be adjusted in accordance therewith.

Further, the machining performance inspection device 40 that inspects the machining performance achieved on the laser welded crimp portion Ta is provided on the downstream side of the laser welding device 30. By inspecting the laser machining performance using the machining performance inspection device 40, the pressing, the welding, and the machining performance inspection can all be executed in a single process, and therefore a terminal manufacturing apparatus 1 having a high terminal manufacturing speed can be provided.

2. Second Embodiment

[2-1. Configuration]

A terminal manufacturing apparatus 2 according to a second embodiment of the present disclosure will now be described with reference to FIGS. 5 to 7. As shown in FIG. 5, the terminal manufacturing apparatus 2 is configured substantially identically to the terminal manufacturing apparatus 1 according to the first embodiment, but differs therefrom in that a sag position detection sensor 90 is provided on the conveyance path of the chained terminal T between the pressing device 20 and the laser welding device 30. Further, since the sag position detection sensor 90 is provided, a modification is added to the control performed on the laser welding device 30 by the control device 60. This will be described specifically below. Note that description of other configurations that are identical to the first embodiment has been omitted.

As described above, the sag position detection sensor 90 is disposed on the conveyance path of the chained terminal T between the pressing device 20 and the laser welding device 30. A conventional sensor such as an ultrasonic sensor may be used as the sensor. The sag position detection sensor 90 detects an amount of up-down positional deviation from a reference position in a vertical direction of the chained terminal T detected by the sensor. When the chained terminal T deviates upward from the reference position, it can be determined that the processing of the conveying/positioning mechanism 80 is fast, and when the chained terminal T deviates downward from the reference position, on the other hand, it can be determined that the processing of the conveying/positioning mechanism 80 is slow.

The sag position detection sensor 90 inputs the detected amount of positional deviation into the positioning/machining time calculating unit 62. The positioning/machining time calculating unit 62 calculates the pressing time, the laser machining time, and the index time in the manner described in the first embodiment on the basis of the input from the sag position detection sensor 90.

Calculation of the pressing time, the laser machining time, and the index time by the positioning/machining time calculating unit 62 will now be described specifically using FIGS. 6 and 7.

Figure 6:
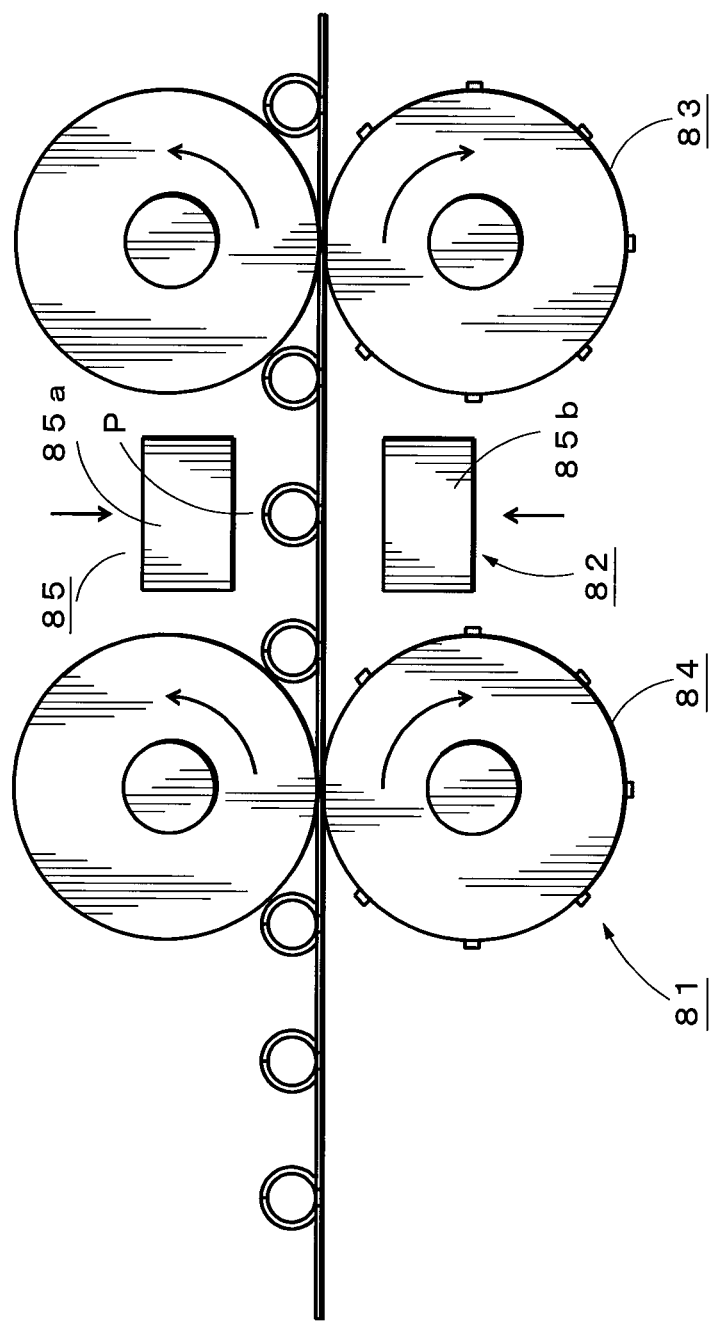
FIG. 6 is a schematic diagram showing an example of a conveying/positioning mechanism according to the second embodiment of the present disclosure.

FIG. 6 is a view showing an example of a configuration of the conveying/positioning mechanism 80, which is used in illustrating an example of the calculations performed by the positioning/machining time calculating unit 62. Further, FIG. 7 is a timing chart showing processing timings of respective constituent elements of the laser welding device 30 on the basis of the laser machining time and the index time calculated by the positioning/machining time calculating unit 62.

As shown in FIG. 6, the conveying/positioning mechanism 80 used in this example is constituted by a conveyance mechanism 81 that conveys the chained terminal T, and a positioning mechanism 82 that positions the crimp terminal ST of the chained terminal T in a welding machining position P.

The conveyance mechanism 81 includes conveying rollers 83 and pulling rollers 84 that rotate while sandwiching the carrier portion C1 of the chained terminal T from above and below in the vicinity of an upstream side and a downstream side of the welding machining position P in the conveyance direction of the chained terminal T.

The positioning mechanism 82 includes a clamping mechanism 85 constituted by an upper clamping jig 85a and a lower clamping jig 85b as a mechanism that positions the crimp terminal ST in the welding machining position P and ensures a degree of welding precision at which a gap in the butted interface Tc of the crimp terminal ST is eliminated.

By configuring the conveyance mechanism 81 and the positioning mechanism 82 such that the crimp portion Ta of the crimp terminal ST is sandwiched from above and below by the two clamping jigs 85a, 85b in this manner, the butted interface Tc of the crimp portion Ta is pressed such that the crimp terminal ST is positioned in the welding machining position P. The laser welding device 30 then performs laser welding on the butted interface Tc.

Figure 7:
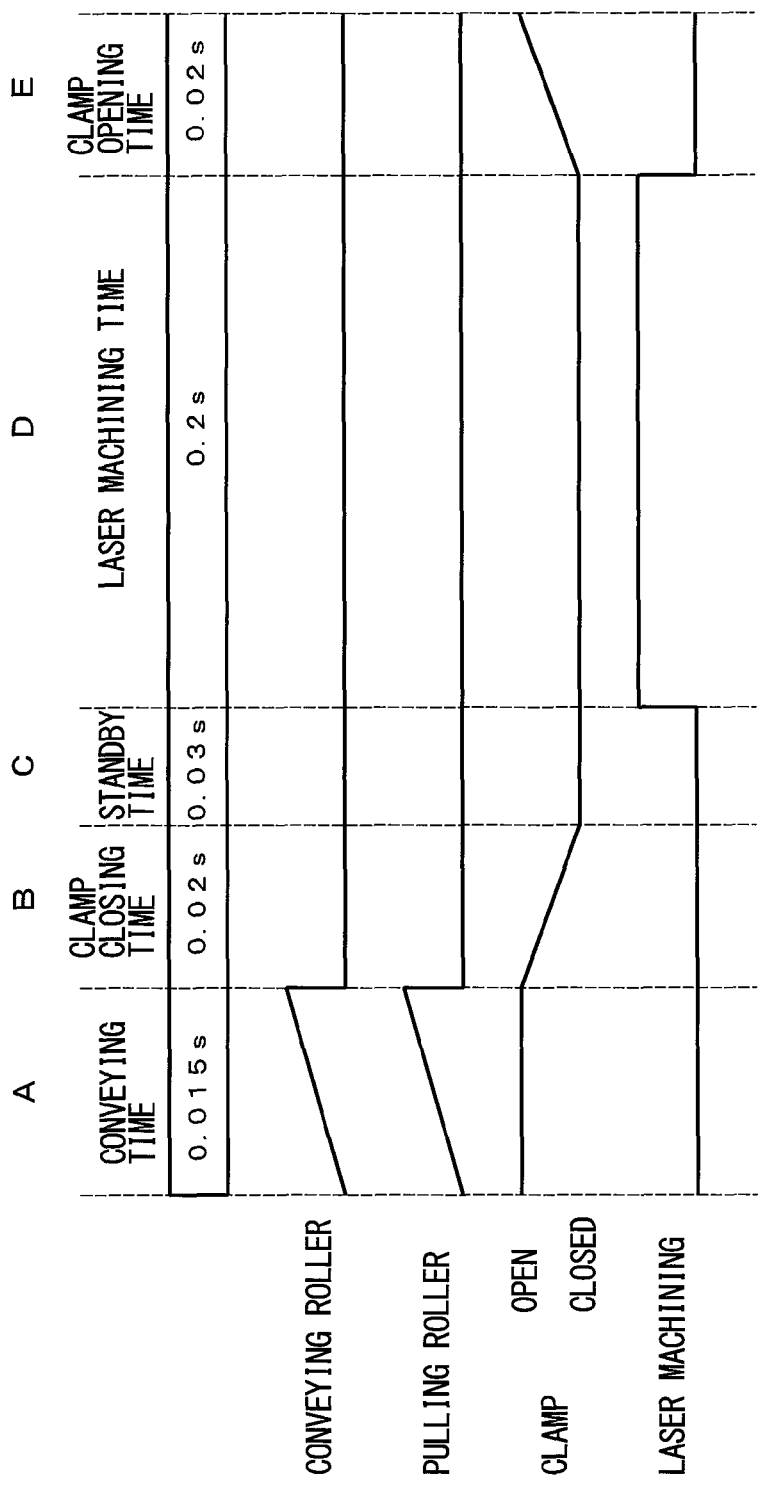
FIG. 7 is a timing chart showing an example of a conveying/positioning processing time according to the second embodiment of the present disclosure.

FIG. 7 shows timings of the laser machining using the laser light source 71 and the laser irradiation optical device 72 of the laser welding device 30 and the processing time required by the conveying/positioning mechanism 80 to process a single crimp terminal ST. As shown in the drawing, the processing time of the conveying/positioning mechanism 80 includes five phases, namely times A to E.

More specifically, the times A to E includes a "conveyance time A" in which the crimp terminal ST is moved to the processing position, a "clamp closing time B" required by the clamping mechanism 85 to position the crimp terminal ST in the processing position, a "standby time C" in which a time adjustment is made on the basis of a relationship between the pressing time and the laser machining time and index time, a "laser machining time D" required for the laser welding device 30 to perform laser welding, and a "clamp opening time E" of the clamping mechanism 85.

With such a timing chart, the positioning/machining time calculating unit 62 performs a calculation such that the sum of A to E, i.e., the processing time of the laser welding device 30, matches the pressing time of the pressing device 20. In other words, the laser machining time and the index time are set to be shorter than the pressing time, and a difference between the pressing time and the laser machining time and index time is adjusted by providing the standby time C.

For example, when a manufacturing time for a single crimp terminal ST (i.e. the pressing time) in the pressing device 20 is 0.3 seconds, the laser machining time and index time must be set likewise at 0.3 seconds. In this case, when the laser machining time is 0.2 seconds and the index time is 0.07 seconds, the difference between the pressing time and the laser machining time and index time is 0.03 seconds, and therefore the positioning/machining time calculating unit 62 calculates 0.03 seconds as the standby time C, during which the processing of the laser welding device 30 is held on standby.

When, during the processing described above, the sag position detection sensor 90 determines that the chained terminal T has deviated upward from the reference position and that the processing of the conveying/positioning mechanism 80 is fast, processing is performed to increase the standby time C in order to eliminate the difference between the pressing time and the laser machining time and index time. When, on the other hand, the sag position detection sensor 90 determines that the chained terminal T has deviated downward from the reference position and that the processing of the conveying/positioning mechanism 80 is slow, processing is performed to reduce the standby time C in order to eliminate the difference between the pressing time and the laser machining time and index time.

[2-2. Effects]

According to the present embodiment, described above, the sag position detection sensor 90 is provided on the conveyance path of the chained terminal T between the pressing device 20 and the laser welding device 30 to detect the sag amount of the conveyed chained terminal T. Hence, a deviation between the conveyance speeds of the pressing device 20 and the laser welding device 30 can be detected on the basis of the sag amount of the chained terminal T between the pressing device 20 and the laser welding device 30, and the conveying/positioning mechanism 80 can correct the conveying/positioning time of the laser welding device 30 on the basis thereof. As a result, the pressing time and the welding time can be synchronized more accurately.

As a specific unit for correcting the processing time of the pressing device 20 and the processing time of the laser welding device 30, when the sag protrudes upward or downward in the vertical direction, the welding time of the laser welding device 30 is determined to be short or long, and the conveying/positioning time is corrected accordingly. As a result, the pressing time and the welding time can be synchronized more accurately.

3. Specific Embodiments of the Conveying/Positioning Mechanism

Next, specific examples for realizing the conveying/positioning mechanism 80 of the laser welding device 30 according to the first and second embodiments will be described. Note that in the present disclosure, an example in which the processes of the pressing device and the laser welding device are performed continuously, as described above, is provided. However, the following examples are not limited to cases, in which the conveying/positioning mechanism of the laser welding device functions as described above to perform a series of processes with the pressing device, and obviously be used in a case where the laser welding device performs a separate process independently of the pressing device.

[3-1. First Example of Conveying/Positioning Mechanism]

(Configuration)

Figure 9:
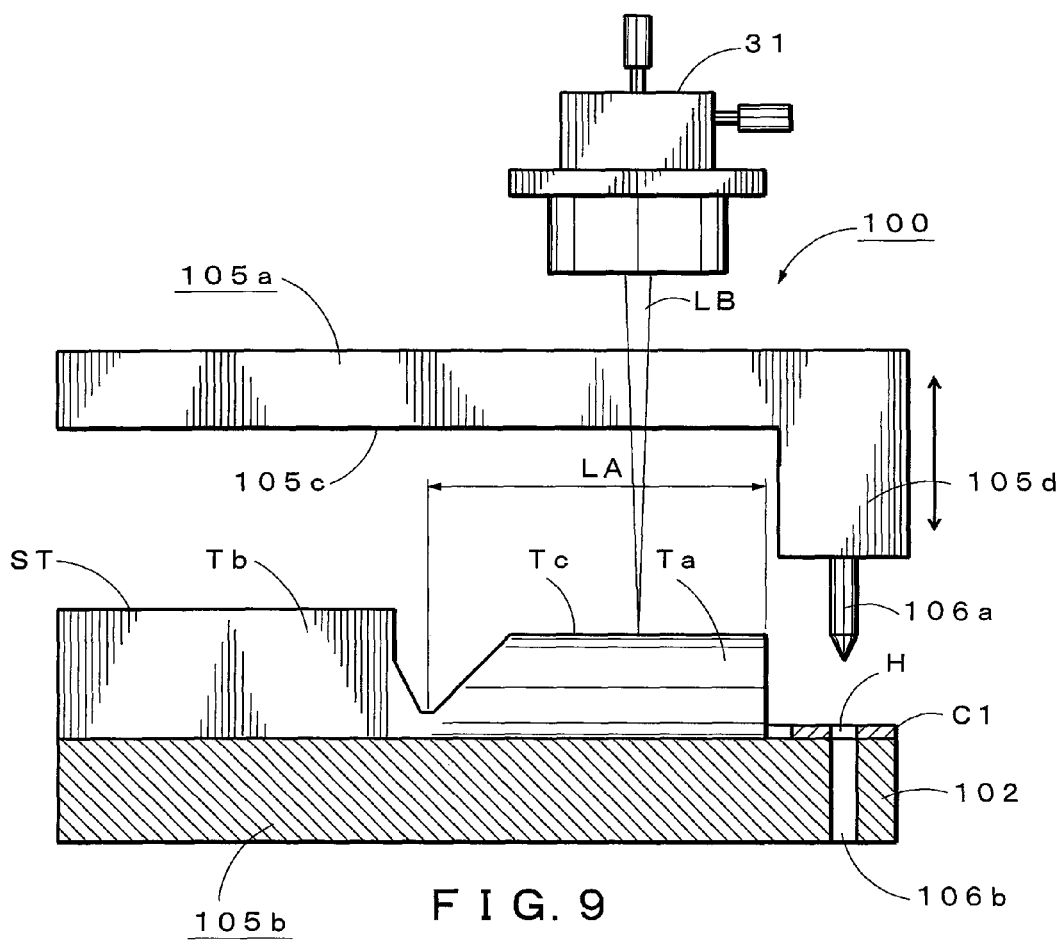
FIG. 9 is a side view of the positioning mechanism shown in FIG. 8.

A first example of the conveying/positioning mechanism 80 will be described as a conveying/positioning mechanism 100 with reference to FIGS. 8 and 9. FIG. 8 is a front view showing the conveying/positioning mechanism 100 from a right angle direction relative to the conveyance direction of the chained terminal T. FIG. 9 is a lateral sectional view showing the conveying/positioning mechanism 100 in the conveyance direction of the chained terminal T.

As shown in the drawings, the conveying/positioning mechanism 100 is constituted by a conveyance mechanism 101 for conveying the chained terminal T, and a positioning mechanism 102 for positioning the crimp terminal ST of the chained terminal T in the welding machining position P. Further, a laser welding unit 31 is provided above the conveying/positioning mechanism 100 in the welding machining position P. As described above, the laser welding unit 31 emits the laser beam LB so as to sweep and irradiate the butted interface Tc of the crimp terminal ST held by the carrier portion C1 of the chained terminal T positioned in the welding machining position P.

The conveyance mechanism 101 includes conveying rollers 103 and pulling rollers 104 that rotate while sandwiching the carrier portion C1 of the chained terminal T from above and below in the vicinity of the upstream side and the downstream side of the welding machining position P in the conveyance direction of the chained terminal T.

The conveying rollers 103 and the pulling rollers 104 are formed symmetrically about the welding machining position P, and driven synchronously. The conveying rollers 103 and the pulling rollers 104 are respectively driven intermittently by a servo motor or the like, not shown in the drawings, so as to convey and stop the chained terminal T repeatedly, and are capable of high-precision positioning so that the butted interface Tc of the crimp terminal ST is positioned in the welding machining position P. The conveying rollers 103 and the pulling rollers 104 may be configured using any system, such as a roll feed system, a gripper feed system, or a sprocket system.

The positioning mechanism 102 includes a clamping mechanism 105 and a pin positioning mechanism 106 as a mechanism for positioning the crimp terminal ST in the welding machining position P and securing a degree of welding precision at which the gap in the butted interface Tc of the crimp terminal ST is eliminated.

The clamping mechanism 105 is constituted by an upper clamping jig 105*a* and a lower clamping jig 105*b*. Here, as shown in FIGS. 8 and 9, the lower clamping jig 105*b* performs positioning in the vertical direction without moving in an up-down direction by supporting the entire crimp terminal ST and the carrier portion C1 of the chained terminal T from a bottom surface side.

The upper clamping jig 105*a*, meanwhile, is driven by a driving mechanism not shown in the drawings to move up and down between a position contacting an upper end portion of the crimp terminal ST and a withdrawn position shown in the drawings at a predetermined timing based on the calculation results of the positioning/machining time calculating unit 62. The upper clamping jig 105*a* may be driven to move up and down by driving a motor to rotate using a cam mechanism, not shown in the drawings, or by direct driving using a solenoid.

More specifically, as shown in FIG. 9, the upper clamping jig 105*a* is formed in an L shape when seen from the side, and includes an elongated depth portion 105*c* that extends in an axial direction of the crimp terminal ST so as to contact an upper surface portion of the crimp terminal ST, and a longitudinal portion 105d that contacts an upper surface of the carrier portion C1 of the chained terminal T.

As shown by dotted lines and arrows indicating a range in FIG. 9, an irradiation area LA of the laser beam LB emitted from the laser welding unit 31 extends in an axial direction of the crimp portion Ta of the crimp terminal ST. Accordingly, as shown by dotted lines in FIG. 8, an irradiation hole 105e is provided in the upper clamping jig 105a in accordance with the irradiation area LA in order to secure an irradiation optical path for the laser beam LB.

The lower clamping jig 105b is an elongated rod-shaped body having an equal length to an axial direction length of the crimp terminal ST, and is configured to support the crimp terminal ST from the bottom surface of the carrier portion C1 of the chained terminal T up to a position reaching the connector portion Tb.

The pin positioning mechanism 106 includes a pilot pin 106a provided on a bottom surface side of the longitudinal portion 105d forming the end portion of the upper clamping jig 105a, and a positioning hole 106b provided in an end portion of the lower clamping jig 105b in a position aligning with the pilot pin 106a in the vertical direction. The pin positioning mechanism 106 is designed such that when the hole H provided in the carrier portion C1 of the chained terminal T is positioned above the positioning hole 106b, the crimp terminal ST is positioned in the welding machining position P.

(Effects)

In the conveying/positioning mechanism 100 described above, by driving the conveying rollers 103 and the pulling rollers 104 to rotate synchronously, the crimp terminal ST of the chained terminal T is conveyed to and stopped in the welding machining position P in which the laser machining is implemented (see "conveying time A" in FIG. 7). The upper clamping jig 105a is then driven to descend such that the depth portion 105c contacts the upper surface portion of the crimp terminal ST and the longitudinal portion 105d contacts the upper surface of the carrier portion C1 of the chained terminal T. Further, at the same time, the pilot pin 106a penetrates the hole H provided in the carrier portion C1 and the positioning hole 106b. As a result, the crimp terminal ST is positioned in the welding machining position P (see "clamp closing time B" in FIG. 7). Note that here, description of the standby time C has been omitted.

Next, the laser beam LB is emitted from the laser welding unit 31 onto the butted interface Tc in order to weld the butted interface Tc (see "laser machining time D" in FIG. 7). When the welding is complete, the upper clamping jig 105a is raised such that the pilot pin 106a is withdrawn from the positioning hole 106b and the hole H, and as a result, the crimp terminal ST and the chained terminal T are released from a positioned condition (see "clamp opening time E" in FIG. 7).

Next, the conveying rollers 103 and the pulling rollers 104 are driven to rotate synchronously such that the crimp terminal ST, having completed the welding machining, is moved from the welding machining position P and the crimp terminal ST to be subjected to the welding machining next is moved to the welding machining position P.

In the conveying/positioning mechanism 100, by conveying the chained terminal T using the conveying rollers 103 and the pulling rollers 104, which are driven by a servo motor or the like, the crimp terminal ST can be conveyed to the welding machining position P at high speed and with a high degree of precision. Further, positioning in the welding machining position P can be performed even more precisely by having the clamping mechanism 105 sandwich the crimp terminal ST from the upper and lower surfaces thereof, and having the pin positioning mechanism 106 position the hole H provided in the carrier portion C1 using the pilot pin 106a. As a result, laser welding can be performed on the butted interface Tc of the crimp terminal ST reliably, and therefore a manufacturing apparatus exhibiting high yield can be provided. Furthermore, when the conveying rollers 103 and the pulling rollers 104 are sprocket type rollers or the like, welding can be performed even more accurately by providing a separate perforation in addition to the hole H in order to prevent the hole H from deforming.

Moreover, the irradiation hole 105e for securing the irradiation optical path of the laser beam LB is provided in alignment with the irradiation area LA, and therefore laser welding can be performed in a condition where the crimp terminal ST is positioned by sandwiching the carrier portion C1 of the chained terminal T from the upper and lower surfaces thereof using the clamping mechanism 105.

[3-2. Second Example of Conveying/Positioning Mechanism]

Figure 10:
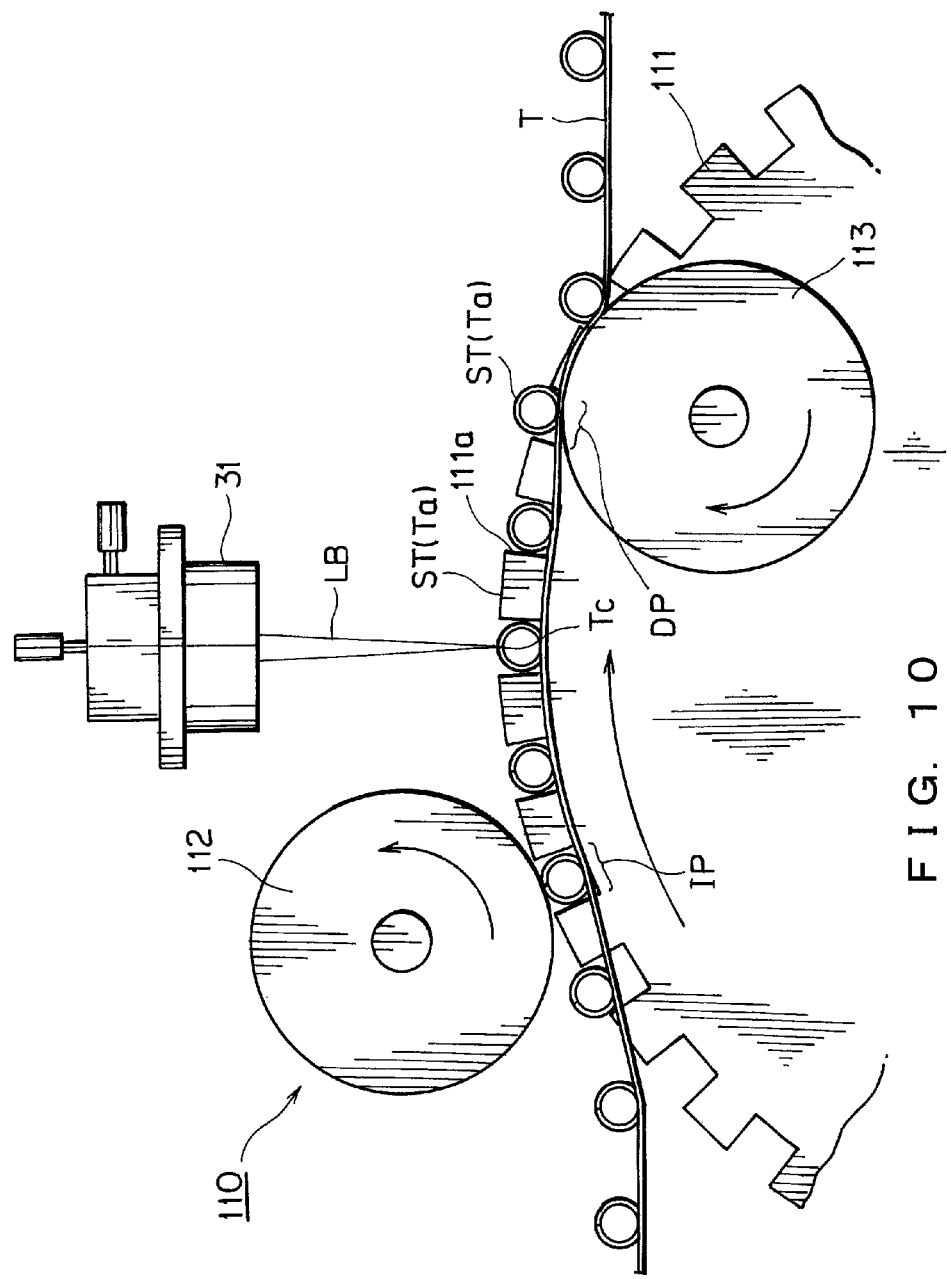
FIG. 10 is a schematic diagram showing an example of a conveying/positioning mechanism used in a laser welding device according to an embodiment of the present disclosure.

A second example of the conveying/positioning mechanism 80 will be described as a conveying/positioning mechanism 110 with reference to FIGS. 10 and 11. FIG. 10 is a front view showing the conveying/positioning mechanism 110 from a right angle direction relative to the conveyance direction of the chained terminal T. FIG. 11 is a lateral schematic diagram showing the conveying/positioning mechanism 110 in the conveyance direction of the chained terminal T.

As shown in the drawings, the conveying/positioning mechanism 110 includes a positioning roller 111 having a large diameter and having insertion grooves 111a in a peripheral surface thereof into which the crimp terminal ST is inserted and thus positioned, a pressing roller 112 provided on the upstream side in the conveyance direction of the chained terminal T to press the crimp terminal ST held on the conveyed chained terminal T into the insertion groove 111a, and a discharge roller 113 provided on the downstream side in the conveyance direction of the chained terminal T to discharge the crimp terminal ST from the insertion groove 111a. Further, similarly to the first example, the laser welding unit 31 is provided above the conveying/positioning mechanism 110 in the welding machining position P.

The conveying/positioning mechanism 110 according to this example differs from the mechanisms described heretofore in that conveyance and positioning of the chained terminal T or the crimp terminal ST are executed by a single mechanism.

Each configuration will now be described. The positioning roller 111 has a cylindrical shape, and includes the plurality of insertion grooves 111a provided in the peripheral surface thereof at a substantially equal pitch to the pitch L of the crimp terminals ST on the chained terminal T. The insertion grooves 111a are formed such that a groove width thereof is substantially identical to a diameter of the crimp terminal ST. When the crimp terminal ST is inserted into the insertion groove 111a, the crimp terminal ST is sandwiched from either side, and therefore the gap in the butted interface Tc can be eliminated. Note that in this example, a side face of the insertion groove 111a is formed to rise in a right angle direction, but this is merely one example, and to ensure that the crimp terminal ST can be inserted easily, the side face of the insertion groove 111a may be tapered or formed such that only an upper end part thereof widens outward, for example.

Further, the positioning roller 111 is rotated in the direction of an arrow in the drawing by a motor or the like, not shown in the drawings. As shown in FIG. 11, a depth of the positioning roller 111 is set at least such that the insertion groove 111a can hold the crimp portion Ta of the crimp terminal ST in the axial direction. Needless to say, the depth may be set such that the crimp terminal ST is inserted into the insertion groove 111a up to the connector portion Tb.

Here, in the example employing the positioning roller 111, the positioning roller 111 can be controlled to convey the crimp terminals ST intermittently while stopping the crimp terminals ST in the welding machining position P, similarly to the examples described above. Alternatively, the positioning roller 111 may convey the crimp terminals ST continuously without stopping while moving the laser irradiation position of the laser welding unit 31 in accordance with the movement of the crimp terminals ST such that the laser beam is emitted onto the butted interface Tc on a diagonal direction trajectory.

The pressing roller 112 has a function for pressing the crimp portion Ta of the welding subject crimp terminal into the insertion groove 111a while rotating, and more specifically, as shown in the side view in FIG. 11, is provided in a position contacting the peripheral surface of the positioning roller 111.

Note that the pressing roller 112 does not require a drive source for rotation, and may be allowed to rotate together with the rotation of the positioning roller 111. Further, the pressing roller 112 is an optimal configuration, and the crimp terminal ST may be pressed into the insertion groove 111a simply by providing a plate-shaped body on an upper side of a crimp terminal ST insertion position, indicated by IP in the drawing, of the positioning roller 111 instead of employing a roller-shaped configuration. Note, however, that the crimp portion Ta of the crimp terminal ST may deform upon contact with the fixed plate-shaped body, and therefore a rotating roller such as that illustrated in this example is preferably employed.

As shown in the lateral schematic diagram in FIG. 11, the discharge roller 113 is provided such that a peripheral surface thereof is positioned in a position corresponding to the carrier portion C1 of the chained terminal T. The peripheral surface of the discharge roller 113 contacts the bottom surface of the carrier portion C1 in a discharge position DP so as to discharge the crimp terminal ST from the insertion groove 111a. Further, similarly to the pressing roller 112, the discharge roller 113 does not require a drive source to rotate, and may be rotated by a frictional force generated upon contact with the bottom surface of the carrier portion C1 as the chained terminal T is conveyed.

Note that the discharge roller 113, similarly to the pressing roller 112, need not be configured in a roller shape, and the crimp terminal ST may be discharged from the insertion groove 111a simply by providing a plate-shaped body in the discharge position DP. Note, however, that likewise in this case, the crimp portion Ta of the crimp terminal ST may deform upon contact with the fixed plate-shaped body, and therefore a rotating roller such as that illustrated in this example is preferably employed.

(Effects)

In the conveying/positioning mechanism 110 described above, the crimp terminal ST is inserted into the insertion groove 111a of the positioning roller 111 that is driven to rotate, and therefore the crimp terminal ST can be positioned in the welding machining position and the gap in the butted interface Tc can be eliminated at the same time as the chained terminal T is conveyed. Thus, a function for securing welding precision can be secured. In particular, the chained terminal T and the crimp terminal ST can be conveyed and positioned using a single mechanism, and therefore control can be performed easily, while positioning and welding machining can be performed at high speed and with a high degree of precision.

Further, when the laser welding unit 31 includes a mechanism with which the conveyed crimp terminal ST can be welded in a diagonal direction along the conveyance path, the need to stop the crimp terminal ST in the welding machining position using the positioning roller 111 is eliminated, and therefore processing can be performed while conveying the crimp terminals ST continuously. Likewise in this case, therefore, control can be performed easily.

Moreover, by forming the pressing roller 112 and the discharge roller 113 in a roller shape, the pressing roller 112 and the discharge roller 113 can insert and discharge the crimp terminal ST into and from the insertion groove 111a while rotating in accordance with the rotation of the positioning roller 111. As a result, the crimp terminal ST can be guided into and discharged from the insertion groove 111a without exerting excessive frictional force and pressing force on the crimp terminal ST.

[3-3. Third Example of Conveying/Positioning Mechanism]

Figure 12:
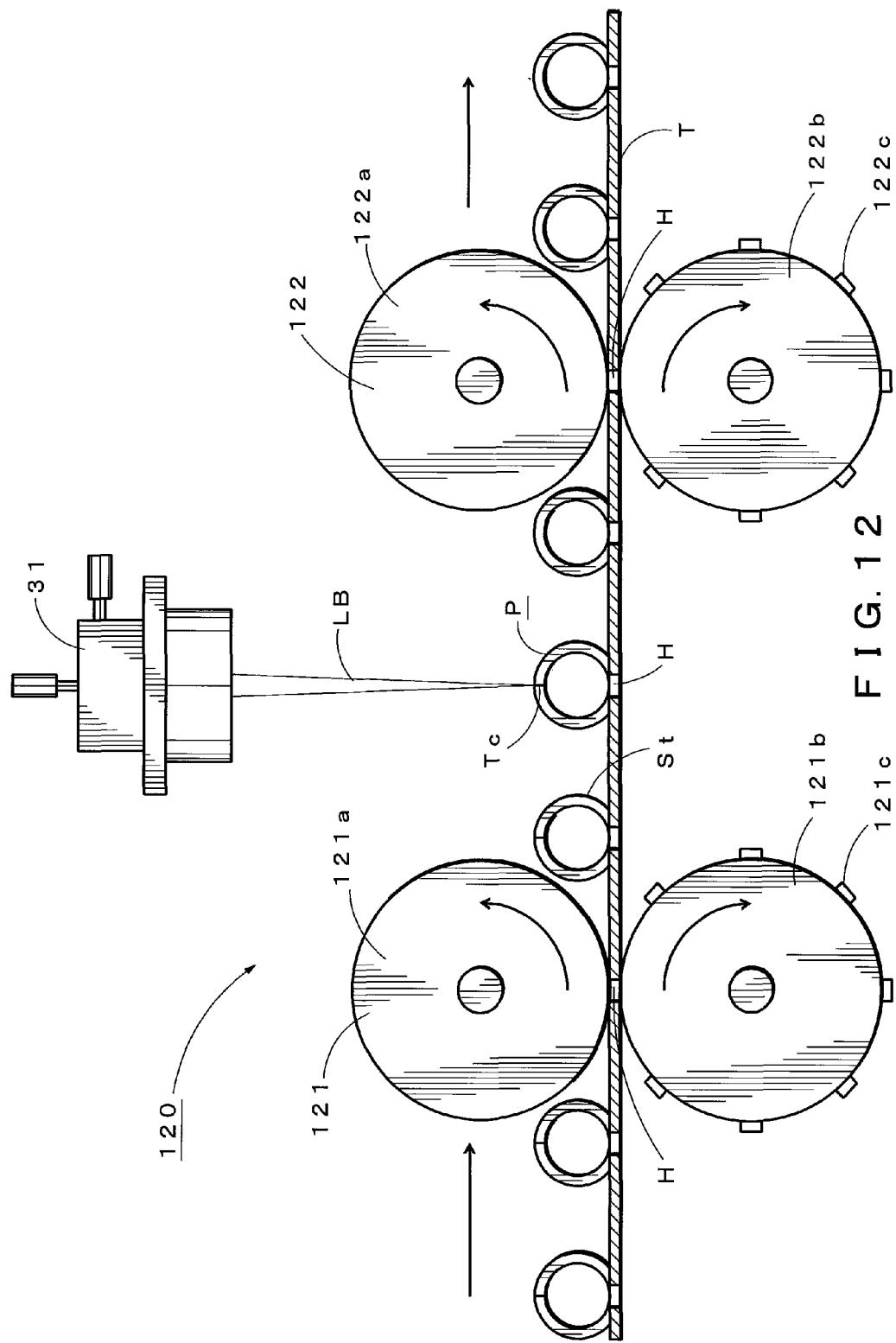
FIG. 12 is a schematic diagram showing an example of a conveying/positioning mechanism used in a laser welding device according to an embodiment of the present disclosure.
Figure 13:
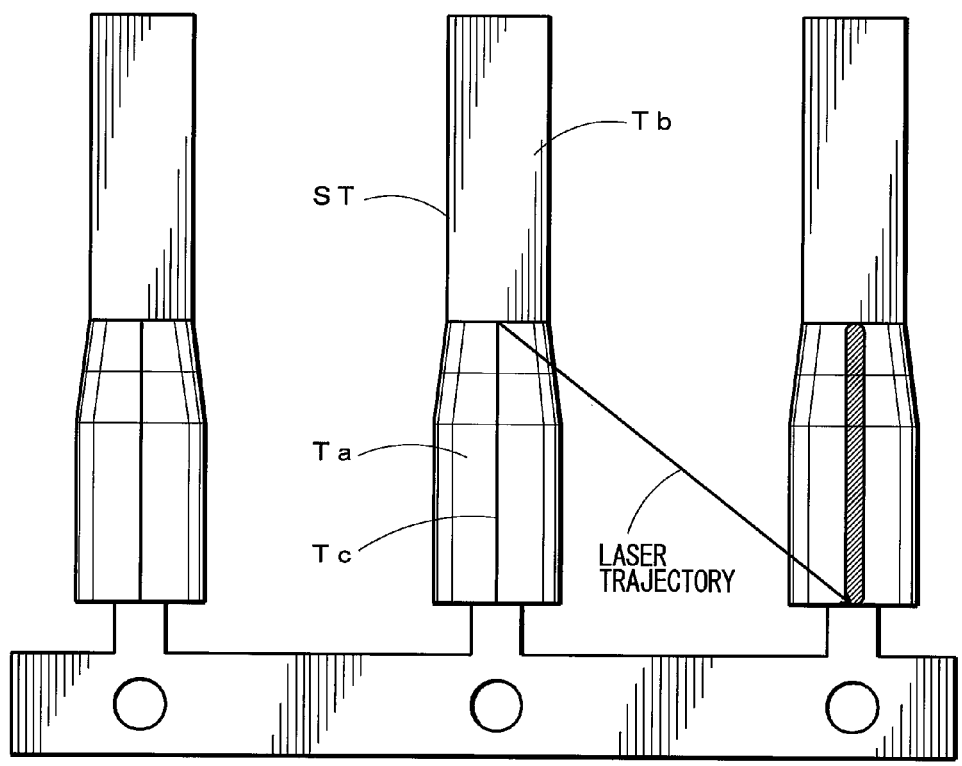
FIG. 13 is an image diagram showing a laser irradiation trajectory during laser welding performed using the positioning mechanism of FIG. 12.

A third example of the conveying/positioning mechanism 80 will be described as a conveying/positioning mechanism 120 with reference to FIGS. 12 and 13. FIG. 12 is a front view showing the conveying/positioning mechanism 120 from a right angle direction relative to the conveyance direction of the chained terminal T. FIG. 13 is a schematic diagram showing a laser trajectory over the crimp terminals ST according to this example.

As shown in FIG. 12, the conveying/positioning mechanism 120 includes conveying rollers 121 and pulling rollers 122 on the upstream side and the downstream side of the welding machining position P (in this case, the position denotes a welding range rather than a specific position). Further, similarly to the first example, the laser welding unit 31 is provided above the conveying/positioning mechanism 120 in the welding machining position P.

The conveying rollers 121 and the pulling rollers 122 are respectively configured to convey the chained terminal T while sandwiching the carrier portion C1 of the chained terminal T in the up-down direction. The conveying rollers 121 and the pulling rollers 122 respectively include a restraining roller 121a and a restraining roller 122a that contact the surface of the carrier portion C1 from above to suppress upward positional deviation of the chained terminal T. Further, the conveying rollers 121 and the pulling rollers 122 respectively include a conveying roller 121b and a conveying roller 122b that are formed in a sprocket shape and include a plurality of insertion pins 121c provided on a periphery thereof in accordance with the pitch L of the holes H provided in the carrier portion C1 so as to be inserted into the holes H from below. Separate perforations other than the holes H may also be provided to prevent the holes H from deforming.

The upper restraining rollers 121a and 122a do not necessarily have to be driven to rotate, and may be configured to rotate in response to the conveyance direction movement of the carrier portion C1 while suppressing upward positional deviation thereof. The conveying rollers 121b and 122b, on the other hand, are driven to rotate synchronously by a motor, not shown in the drawings, and respective rotation speeds of the conveying rollers 121b and 122*b* are controlled such that the carrier portion C1 of the chained terminal T does not sag.

The rotation speeds of the conveying rollers 121*b* and 122*b* are input into the laser welding unit 31. Furthermore, rotation angles or rotation amounts of the conveying rollers 121*b* and 122*b* are detected by a rotary encoder or the like, and this information is likewise input into the laser welding unit 31. Accordingly, as shown in FIG. 13, the laser welding unit 31 is controlled to be capable of performing the welding machining while the crimp terminals ST move using a laser beam LB trajectory set in a diagonal (XY) direction relative to the conveyance direction.

(Effects)

In the conveying/positioning mechanism 120 described above, the conveying rollers 121 and the pulling rollers 122 provided upstream and downstream of the welding machining position P are respectively provided with the conveying rollers 121*a* and 122*b* that convey the chained terminal T while contacting the carrier portion C1 and the restraining rollers 121*b* and 122*b* that contact the carrier portion C1 from above to prevent positional deviation thereof, and thus convey and position the chained terminal T.

In the conveying/positioning mechanism 120, the irradiation trajectory of the laser beam LB emitted by the laser welding unit 31 is set in the diagonal direction in alignment with the conveyance direction of the chained terminal T. As a result, the welding machining can be implemented on the butted interface Tc of the crimp terminal ST while conveying the chained terminal T continuously without stopping the conveying rollers 121 and the pulling rollers 122 from rotating. Accordingly, the welding machining can be performed while following the moving chained terminal T. Hence, control of the conveying/positioning mechanism 120 is easy, and since the processing can be performed without stopping the workpiece, positioning of the crimp terminal ST in the welding machining position or the welding machining range can be performed at high speed and with a high degree of precision.

4. Specific Embodiments of Laser Machining Performance Inspection Device

Next, a specific example for realizing the laser machining performance inspection device 40 according to the first and second embodiments will be described.

[4-1. Configuration]

The laser machining performance inspection device 40 is configured as follows in order to inspect, with a high degree of precision, the welding quality of the crimp terminal ST manufactured in the continuous manufacturing process constituted by the press molding performed by the pressing device 20 and the laser machining performed by the laser welding device 30, as described above.

Figure 14:
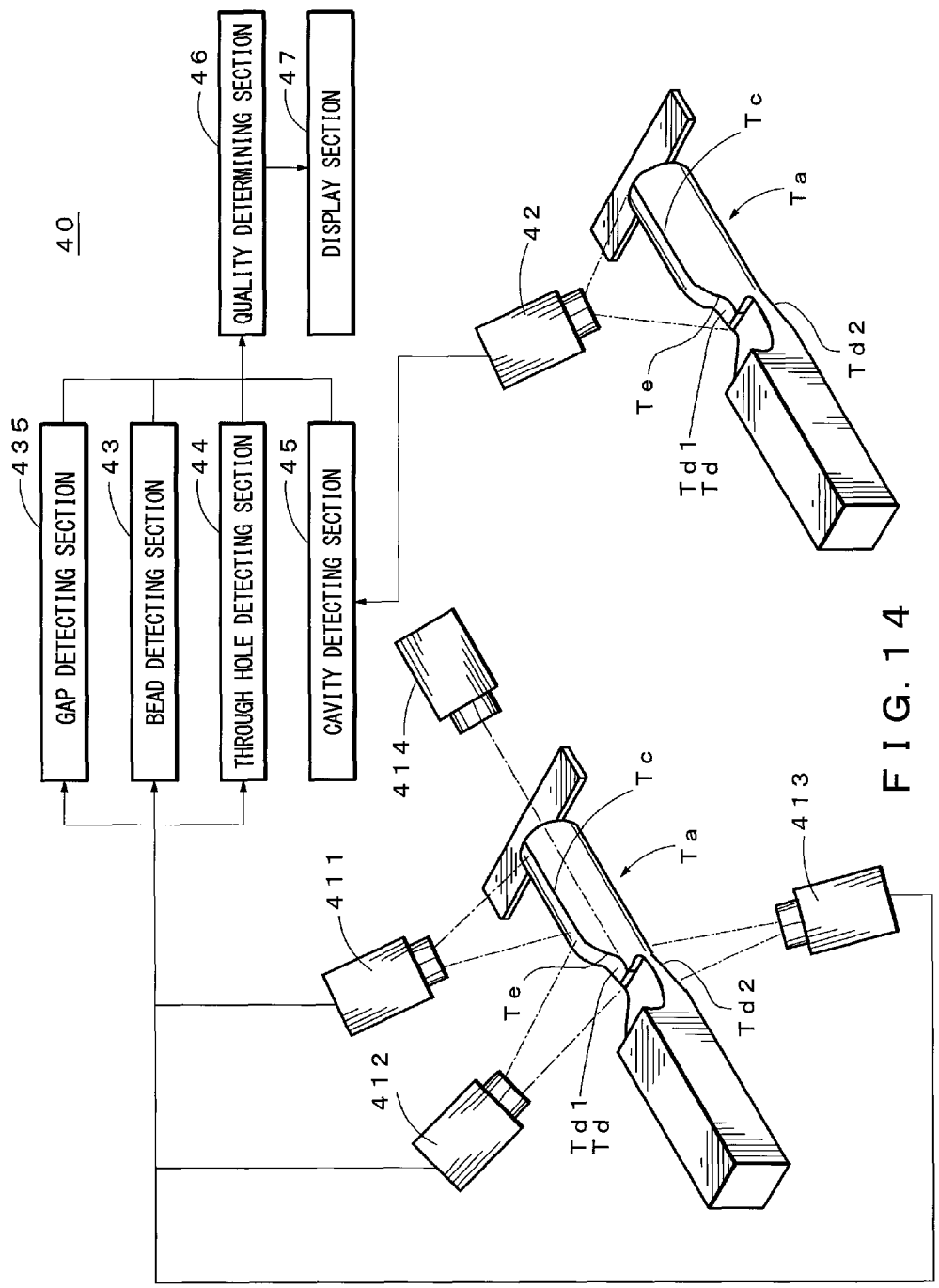
FIG. 14 is a schematic view showing a laser machining performance inspection device for inspecting a welding quality of a laser welded terminal.

As shown in FIG. 14, the laser machining performance inspection device 40 includes four visible light cameras 411, 412, 413, 414, an X-ray camera 42, a bead detecting section 43, a gap detecting section 435, a through hole detecting section 44, a cavity detecting section 45, a quality determining section 46, and a display section 47.

The visible light cameras 411, 412, 413 function as a first image capturing device that capture images of the outer appearance of the crimp terminal ST from respectively different angles of view.

More specifically, the visible light cameras 411, 412 respectively capture images of the outer appearance of the butted portion Tc and a lapped portion Td. As described above, a welding surface of the butted portion Tc on the connector portion Tb side forms an inclined surface Te, and therefore focusing cannot be achieved over the entire welding surface of the butted portion Tc using an image captured by a single visible light camera. When the two visible light cameras 411, 412 are used to capture images from respectively different angles of view, on the other hand, effects from focus deviation are eliminated, and an image of the outer appearance of the entire laser weld portion can be obtained.

As shown in FIG. 14, the visible light camera 413 captures images of the outer appearance of a rear surface Td2 side of an irradiation surface Td1 of the lapped portion Td.

As shown in FIG. 14, the visible light camera 414 captures, as an object, images of an internal shape of the lapped portion Td through an opening in the crimp portion Ta. Further, light is emitted onto the lapped portion Td from the connector portion Tb. Here, when the emitted light leaks from the lapped portion Td into the opening of the crimp portion Tb, the visible light camera 414 can capture images of the leaked light. When the visible light camera 414 captures an image of leaked light in this manner, it can be determined that a gap exists in the lapped portion Td, as will be described below.

The X-ray camera 42 functions as a second image capturing portion that captures images of an internal structure of the laser weld portion. More specifically, the X-ray camera 42 emits an X-ray onto the laser weld portion serving as a measurement subject, and captures an image of the internal structure of the laser weld portion by receiving the X-ray that passes through the laser weld portion. Further, it is difficult to dispose the X-ray camera 42 in a part other than the space in which the visible light cameras 411, 412, 413 are disposed such that image capturing is performed thereby simultaneously, and therefore, as shown in FIG. 14, for example, an image of the internal structure of the laser weld portion is captured after conveying the crimp terminal ST to a predetermined position following image capture by the visible light cameras 411, 412, 413.

Note that the second image capturing portion may perform image capture before the visible light cameras 411, 412, 413, 414. Further, the second image capturing portion is not limited to the X-ray camera 42, and may be an infrared image capturing camera capable of capturing images of the internal structure of the laser weld portion, for example. An infrared camera captures an image of the internal structure by emitting pulse light onto the laser weld portion serving as the measurement subject so as to raise the temperature thereof, and then receiving an infrared ray emitted in a subsequent cooling process. Although an image of the internal structure can likewise be captured by an infrared camera in this manner, a captured image having a higher resolution can be obtained using the X-ray camera 42. Further, as long as it is possible to inspect the respective welding conditions of the butted interface Tc and the lapped portion Td, the number of cameras may be modified appropriately.

The bead detecting section 43 detects beads formed respectively on the butted portion Tc and the lapped portion Td, i.e., the laser weld portion, from the images captured by the visible light cameras 411, 412, 413. More specifically, the bead detecting section 43 detects the beads by implementing edge detection processing or the like on the captured images. Further, the bead detecting section 43 measures a bead width and a bead center position, indicating a center of the bead width, from the detected beads.

The beads detected in the manner described above are formed when optical energy applied by the laser is converted into thermal energy on a metal base material and resulting molten metal resolidifies. Since the beads are formed in this manner, by ensuring that laser irradiation conditions of the laser welding device 30, such as a laser output and a laser scanning rate, are constant and that a degree of adhesion of the butted interface and the lapped portion following laser welding is constant, optical energy is converted into thermal energy appropriately, and as a result, the width of the beads formed by the laser irradiation is substantially constant. Hence, the bead width measured by the bead detecting section 43 serves as a determination index for determining indirectly the welding quality of the butted interface and the lapped portion following laser welding.

Figure 15A:
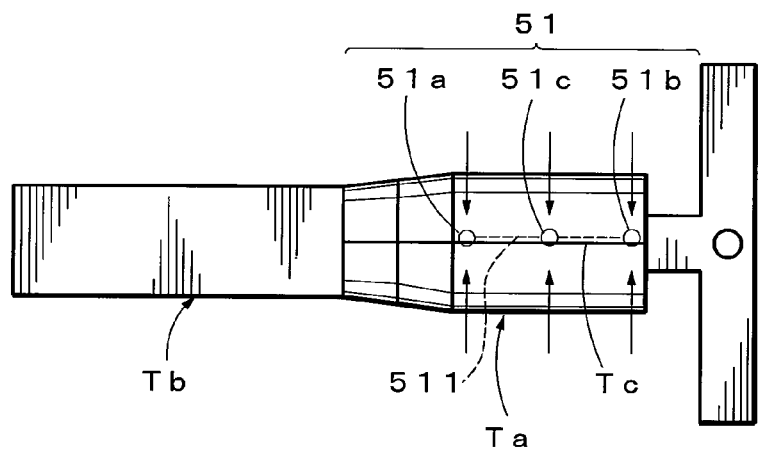
FIGS. 15A and 15B are views illustrating a detection process performed by a bead detecting section.

Furthermore, as shown in FIG. 15A, when the bead detecting section 43 measures the bead width of a bead 51 formed on the butted portion Tc, the bead width is preferably measured in at least three points, namely respective end portions 51a, 51b and a central portion 51c of a center line 511 of the bead 51. By detecting the bead width in at least three points in this manner, the bead width can be measured with a high degree of precision in points other than these three points through interpolation processing or the like.

Figure 15B:
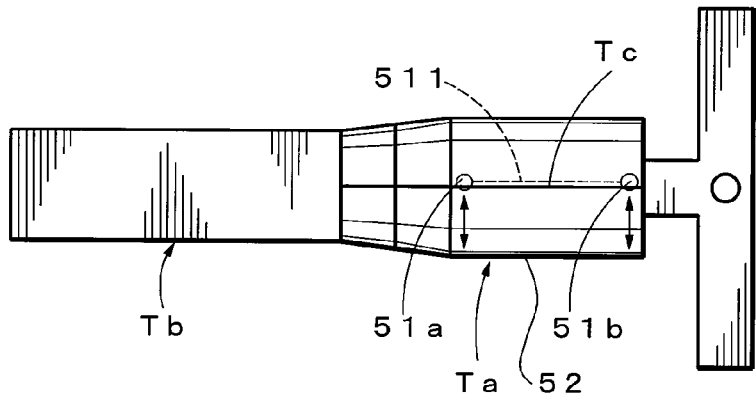

Moreover, as shown in FIG. 15B, when the bead detecting section 43 measures the bead center position of the bead 51 formed along the butted portion Tc, the bead center position is preferably measured in at least two points, namely the respective end portions 51a, 51b of the center line 511 of the bead 51, using a terminal side portion 52 in a width direction of the crimp portion Ta as a reference. The laser beam is swept along a straight line by the laser welding device 30, and therefore, by measuring the bead center position in at least two points, the bead center position can be measured with a high degree of precision in points other than these two points through interpolation processing or the like.

The gap detecting section 435 detects a gap in the lapped portion Td when leaked light appears on the image captured by the visible light camera 414.

The through hole detecting section 44 determines from the images captured by the visible light cameras 411, 412 and 413 whether or not a through hole that is most likely to have been caused by a deviation in the irradiation position of the laser beam exists in the laser weld portion. More specifically, in the captured images, the luminance of a through hole differs from the luminance of the surrounding base material, and therefore the through hole detecting section 44 can easily detect the presence of a through hole by implementing binarization processing or the like on the luminance of the captured images. More preferably, a through hole can be detected easily by emitting light onto the laser weld portion and capturing an image of resulting leaked light. More specifically, the presence of a through hole can be detected easily by introducing emitted light into the interior of the crimp portion Ta through the opening in the crimp portion Ta, and capturing images of light that leaks out to the exterior using the visible light cameras 411, 412, 413.

Further, the butted portion Tc may not be laser welded by the laser welding device 30 due to positional deviation of the pressing device used to mold the butted portion Tc. In the captured images, the luminance of the laser welded part differs from the luminance of a part that has not been laser welded, and therefore the through hole detecting section 44 can determine whether or not the butted portion Tc includes an unwelded part by implementing binarization processing or the like on the luminance of the captured images.

The cavity detecting section 45 determines whether or not a cavity exists in the internal structure of the laser weld portion from the image captured by the X-ray camera 42. More specifically, in the image captured by the X-ray camera 42, the luminance of a cavity differs from the luminance of the base material, and therefore the cavity detecting section 45 can detect the presence of a cavity easily by implementing binarization processing or the like on luminance information relating to the captured image.

The quality determining section 46 inspects the welding quality of the laser weld portion in accordance with an inspection process to be described specifically below using as a determination index the bead width and the bead center position measured by the bead detecting section 43, and outputs an inspection result to the display section 47.

[4-2. Inspection Process]

(Butted Portion Inspection Process)

Figure 16:
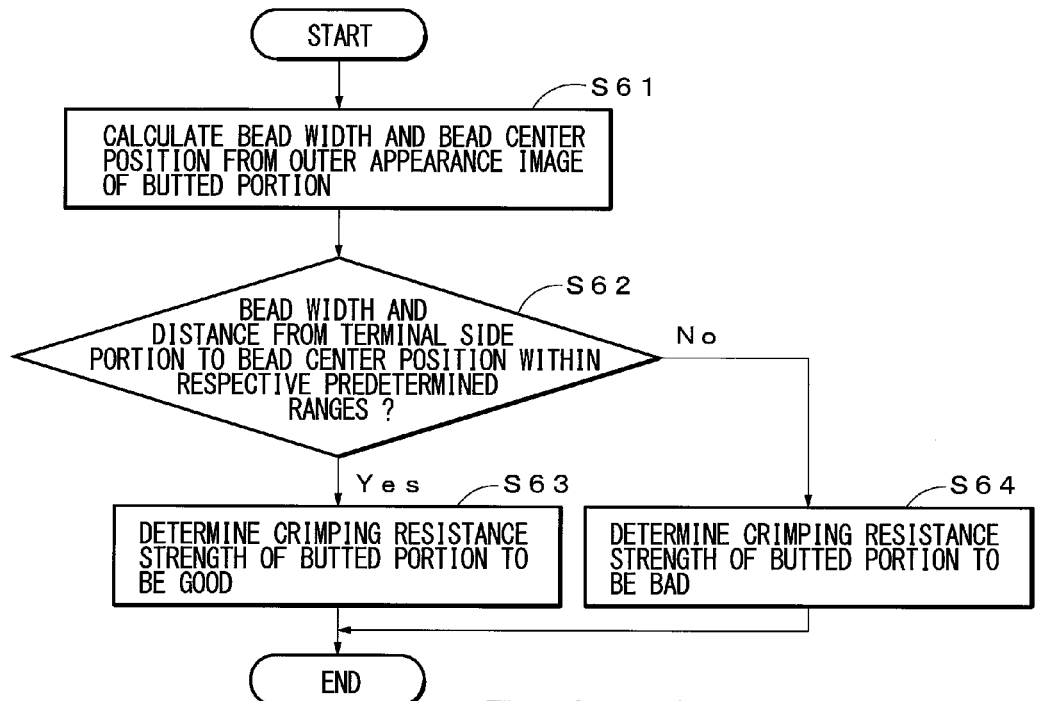
FIG. 16 is a flowchart illustrating a butted portion inspection process.

Next, a specific process performed by the laser machining performance inspection device 40 to inspect the welding quality will be described. First, the laser machining performance inspection device 40 inspects the welding quality of the butted portion Tc in accordance with a flowchart such as that shown in FIG. 16. The bead detecting section 43 detects the bead width and the bead center position of the bead formed on the butted portion Tc from the images captured by the visible light cameras 411, 412 (step S61). Next, the quality determining section 46 determines whether or not conditions according to which the bead width is within a predetermined range and a distance from the width direction terminal side portion 52 of the captured crimp portion Ta to the bead center position is within a predetermined range are satisfied (step S62). When the conditions are satisfied (step S62: Yes), it is determined that the welding quality of the butted portion Tc is good (step S63), and when the conditions are not satisfied (step S62: No), it is determined that the welding quality of the butted portion Tc is bad (step S64).

By implementing steps S61 to S64, the butted portion Tc can be inspected to determine whether or not crimping resistance strength thereof is appropriate. More specifically, by determining the welding quality on the basis of both the bead width and the bead center position, a condition in which the bead center position deviates by a predetermined distance from the width direction terminal side portion 52 of the crimp portion Ta can be determined as a defect. In other words, by implementing steps S61 to S64, a terminal in which the welded butted portion Tc may fracture during crimping even though the bead is formed at a width considered sufficient to withstand the crimping can be determined to be defective.

(Lapped Portion Inspection Process)

Figure 17:
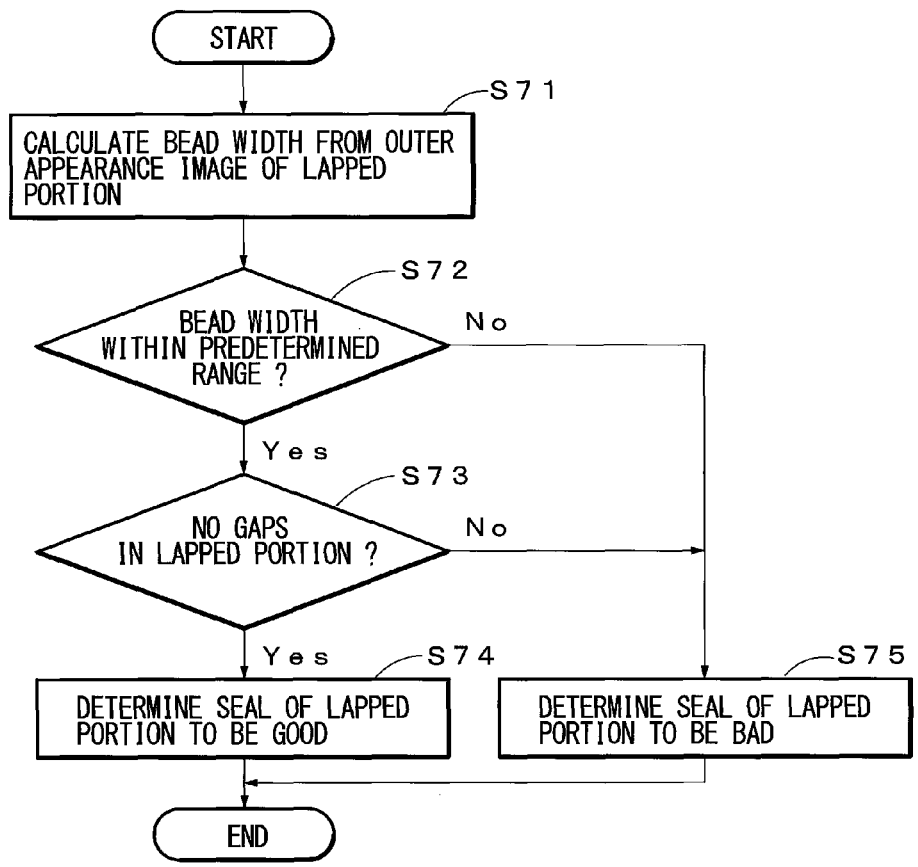
FIG. 17 is a flowchart illustrating a lapped portion inspection process.

The laser machining performance inspection device 40 also inspects the welding quality of the lapped portion Td in accordance with a flowchart such as that shown in FIG. 17. The bead detecting section 43 detects the bead width of a bead formed on the rear surface Td2 of the irradiation surface Td1 of the laser beam from the image captured by the visible light camera 413 (step S71). Next, the quality determining section 46 determines whether or not a condition according to which the bead width is within a predetermined range is satisfied (step S72). When the condition is satisfied (step S72: Yes), the processing advances to step S73, and when the condition is not satisfied (step S72: No), the processing advances to step S75. In step S73, the gap detecting section 435 determines whether or not no gaps exist in the lapped portion Td from the image captured by the visible light camera 414. When no gaps exist (step S73: Yes), the processing advances to step S74, and when a gap exists (step S73: No), the processing advances to step S75. In step S74, the quality determining section 46 determines that a seal of the lapped portion Td is good. In step S75, on the other hand, the quality determining section 46 determines that the seal of the lapped portion Td is bad.

By implementing steps S71 to S75, it is possible to determine with a high degree of precision whether or not the lapped portion Td is sufficiently sealed on the basis of the width of the bead formed on the rear surface of the laser beam irradiation surface and the existence of gaps in the lapped portion Td. Note that the present disclosure is not limited to the processing shown in FIG. 17, and instead, the bead width may be measured after detecting gaps in the lapped portion Td.

(Inspection Process for Determining the Presence of a Through Hole)

Figure 18:
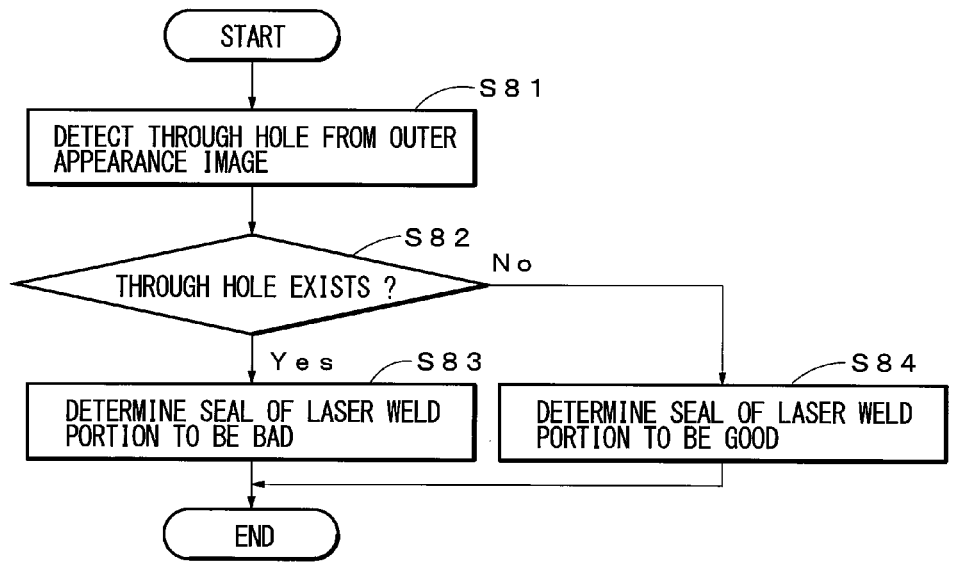
FIG. 18 is a flowchart illustrating an inspection process for determining the presence of a through hole.

In addition to the welding quality inspection processing based on the bead width, the laser machining performance inspection device 40 preferably inspects the welding quality of the laser weld portion in accordance with a flowchart such as that shown in FIG. 18. The through hole detecting section 45 detects the appearance of leaked light, or in other words the existence of a through hole in the laser weld portion, from the images captured by the visible light cameras 411, 412, 413 after introducing irradiation light into the interior of the crimp portion Ta (step S81). Next, the quality determining section 46 determines whether or not a condition according to which a through hole exists is satisfied (step S82). When the condition is satisfied (step S82: Yes), it is determined that a seal on the laser weld portion is bad (step S83), and when the condition is not satisfied (step S82: No), it is determined that the seal on the laser weld portion is good (step S84).

Note that in the laser machining performance inspection device 40, as described above, the through hole detecting section 45 may determine whether there is any butted portion Tc that has not been laser welded at the same time as the detection of the existence of a through hole. By having the laser machining performance inspection device 40 perform detection in this manner, the quality determining section 46 can determine that the seal on the laser weld portion is bad when there is a butted portion Tc that has not been laser welded.

By implementing steps S81 to S84, the seal on the laser weld portion can be inspected with a high degree of precision on the basis of the existence of a through hole and an unwelded part in the butted portion Tc.

(Inspection Process for Determining the Presence of a Cavity)

Figure 19:
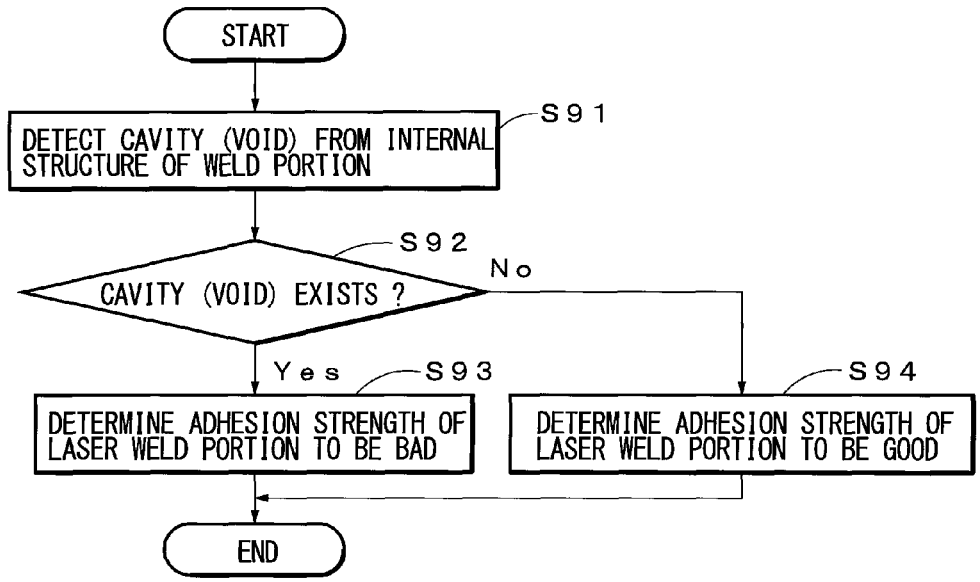
FIG. 19 is a flowchart illustrating an inspection process for determining the presence of a cavity.

Furthermore, in addition to the welding quality inspection processing based on the bead width, the laser machining performance inspection device 40 preferably inspects the welding quality of the laser weld portion in accordance with a flowchart such as that shown in FIG. 19.

The cavity detecting section 45 detects the existence of a cavity, or in other words a void, in the interior of the laser weld portion from the image captured by the X-ray camera 42 (step S91). Next, the quality determining section 46 determines whether or not a condition according to which a void exists is satisfied (step S92). When the condition is satisfied (step S92: Yes), the quality determining section 46 determines that a welding strength of the laser weld portion is bad (step S93), and when the condition is not satisfied (step S92: No), the quality determining section 46 determines that the welding strength of the laser weld portion is good (step S94).

By implementing steps S91 to S94, the seal on the laser weld portion can be inspected with a high degree of precision on the basis of the existence of a void.

(Other)

The laser machining performance inspection device 40 can inspect the welding quality of the laser weld portion with a high degree of precision by performing the inspection processes shown in FIGS. 16 to 19 in any desired combination. Note that in the embodiment described above, the welding quality of the butted portion Tc and the lapped portion Td of the laser welded crimp terminal ST is inspected, but the present disclosure is not limited thereto, and another workpiece processed by laser welding may be inspected instead. For example, the laser machining performance inspection device may inspect a crimp terminal formed by bending respective plate material end portions so as to overlap and performing laser welding on the lapped portion as the workpiece. In other words, the machining machining performance inspection device may inspect the welding quality of a laser weld portion formed by laser welding overlapping plate material end portions using the width of the bead formed on the laser weld portion. When the welding quality of the crimp terminal is determined in the inspection to be good, a stronger seal can be realized than that of the crimp terminal ST having the butted portion Tc described above.

5. Laser Welding Device According to Variant Example

Figure 20:
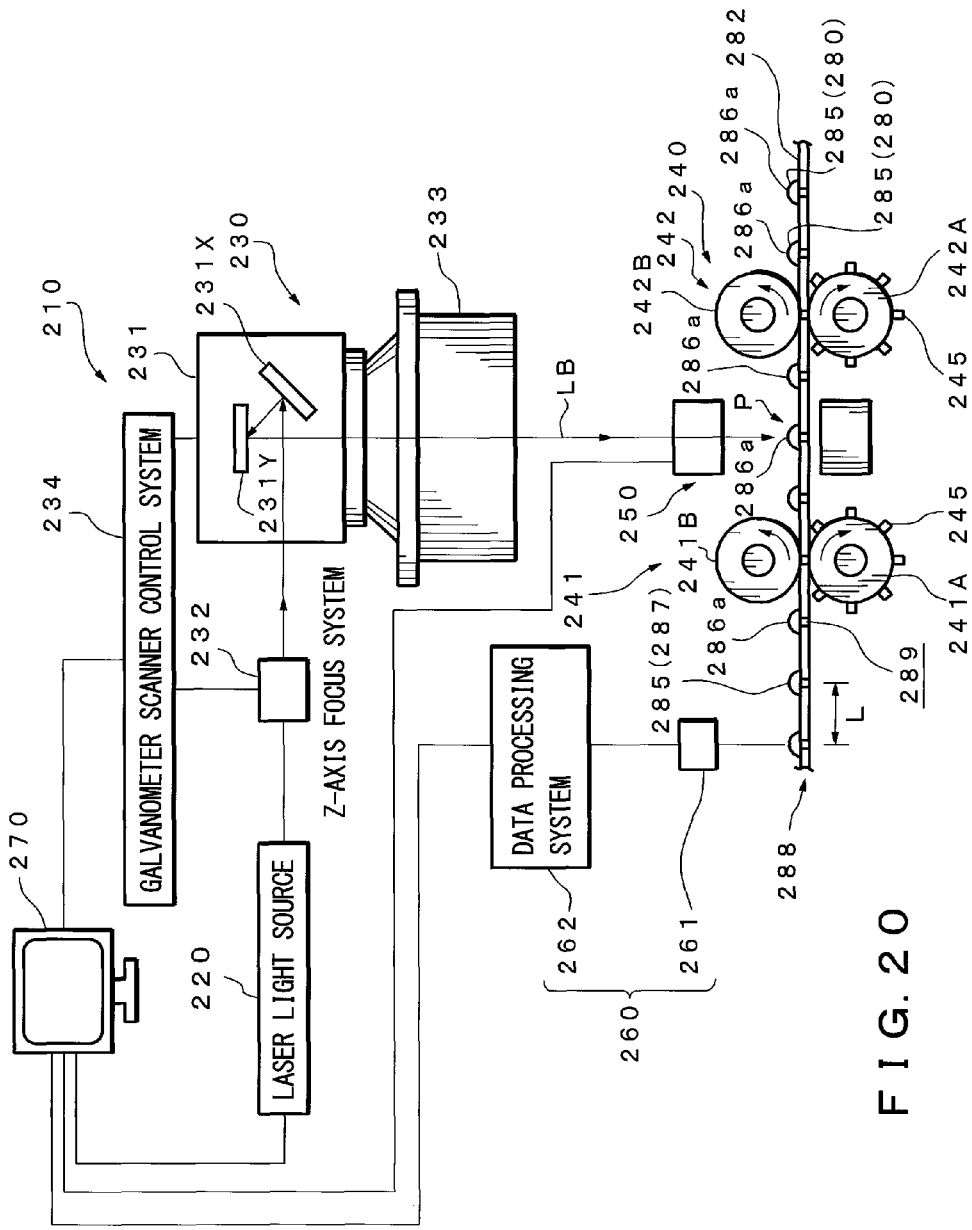
FIG. 20 is a system configuration diagram showing a laser welding device 210 according to a variant example.

A laser welding device according to a variant example of the present disclosure will now be described. FIG. 20 is a system diagram showing a configuration of a laser welding device 210 according to a variant example. The laser welding device 210 is a device that supplies unwelded crimp terminals 287 serving as workpieces successively to a welding machining position, and welds a butted interface 286a and a lapped portion 286b of a crimp portion 285 of the crimp terminal 287 by means of laser irradiation. The crimp terminals 287 are conveyed successively to the welding machining position P at fixed intervals in the form of a chained terminal 288 supported in cantilever fashion by a carrier portion 282, and subjected to welding machining by means of laser irradiation.

The laser welding device 210 includes a laser light source 220, a laser irradiation optical device 230, a conveyance device 240, a workpiece holding mechanism 250, a butted interface shape measurement device 260, and a control device 270.

The laser irradiation optical device 230 is an optical device for guiding a laser beam output from the laser light source 220 to the welding machining position P. The laser irradiation optical device 230 includes an X/Y axis scanner 231, a Z axis scanner 232, and a condenser lens 233.

The X/Y axis scanner 231 is a biaxial (XY) galvanometer scanner in which a laser beam LB from the laser light source 220 is reflected successively by two mirrors 231X, 231Y that are angle-controlled synchronously about mutually orthogonal axes, whereby the laser beam LB is emitted so as to scan the butted interface 286a and the lapped portion 286b of the crimp terminal 287 stopped in the laser machining position P.

The Z axis scanner 232 is an optical device for adjusting an irradiation direction (Z axis direction) focal point position of the laser beam LB scanned by the X/Y axis scanner 231. The Z axis scanner 232 is provided on an optical path of the laser beam LB entering the X/Y axis scanner 231.

The X/Y axis scanner 231 and the Z axis scanner 232 are drive-controlled by a galvanometer scanner control system 234. An irradiation position of the laser beam LB in a horizontal plane can be adjusted by controlling the angles of the mirrors 231X, 231Y, and the scanning rate of the laser beam LB can be adjusted by controlling rotation speeds of the mirrors 231X, 231Y.

The condenser lens 233 is an optical coupling system that condenses the laser beam LB from the X/Y axis scanner 231 in the position of the butted interface 286a and the lapped portion 286b of the crimp terminal 287. A telecentric lens or an fθ lens is used as the condenser lens 233.

The conveyance device 240 is a device that supplies the crimp terminals 287 successively to the welding machining position P by conveying the chained terminal 288 at a constant pitch corresponding to an interval L at which the crimp terminals 287 are arranged thereon. The conveyance device 240 includes pairs of rollers 241, 242 that rotate while sandwiching the carrier portion 282 of the chained terminal 288 from above and below in the vicinity of an upstream side and a downstream side of the welding position P in a conveyance direction of the chained terminal 288. The pairs of rollers 241, 242 are constituted by conveying rollers 241A, 242A that contact a lower surface of the carrier portion 282, and restraining rollers 241B, 242B that contact an upper surface thereof. The restraining rollers 241B, 242B are rotated while restraining the carrier portion 282 from above. The conveying rollers 241A, 242A are driven to rotate at a constant speed by a driving mechanism, not shown in the drawing. Conveying pawls 245 project from respective outer peripheral surfaces of the conveying rollers 241A, 242A at equal intervals in a circumferential direction. The conveying pawls 245 engage with perforations formed in the carrier portion 282. Every time the conveying rollers 241A, 242A rotate by a fixed angle, the conveying pawl 245 engaged with the perforation in the carrier portion 282 moves the chained terminal 288 by a distance corresponding to the interval L at which the crimp terminals 287 are arranged.

The workpiece holding mechanism 250 is a device for holding the crimp terminal 287 supplied to the welding machining position P in an appropriate position/attitude and eliminating a gap in the butted interface 286a.

The butted interface shape measurement device 260 includes a shape detector 261 and a data processing system 262.

The shape detector 261 is disposed in a predetermined position on the upstream side of the welding machining position P so as to face a passage area of the crimp terminals 287. In this example, the shape detector 261 is provided to face a position on the upstream side of the welding machining position P by a distance corresponding to five pitches (L×5). The shape detector 261 thus configured measures the dimension of the gap in the butted interface 286a, and in so doing, the occurrence of defective products and product irregularities can be suppressed. In other words, when a gap that is not within a predetermined range exists in the butted interface 286a, the welding quality deteriorates greatly, but by measuring the gap prior to welding, the occurrence of defective products and product irregularities can be suppressed.

The data processing system 262 processes detection data from the shape detector 261, and outputs the processed detection data as profile data relating to the dimension of the gap in the butted interface 286a. The profile data are input into the control device 270.

When the gap is not within the predetermined range, the shape detector 261 or the data processing system 262 may stop the pressing device or issue an alert.

The control device 270 drive-controls the X/Y axis scanner and the Z axis scanner on the basis of the terminal shape so as to scan the laser beam along the butted interface 286a and the lapped portion 286b while three-dimensionally controlling the focal point position of the laser beam LB precisely such that the strength of the laser beam LB in the irradiation position is sufficient for welding. As a result, the butted interface 286a and the lapped portion 286b of the crimp terminal 287 can be laser welded to a high quality. The measurement performed by the butted interface shape measurement device 260 does not have to be implemented on all of the crimp terminals 287. Instead, the measurement may be implemented on at least one initial crimp terminal 287 when the welding process is started after setting the chained terminal 288 in the laser welding device 210. In so doing, deterioration of the abutting condition due to wear or the like on a die of the terminal pressing device can be confirmed, and the welding quality can be kept constant.

6. Other Embodiments

The present disclosure is not limited to the embodiments described above. Further, various design modifications and other amendments may be added to the respective embodiments on the basis of knowledge of persons skilled in the art, and embodiments to which such amendments have been added may also be included in the scope of the present disclosure.

For example, in the above embodiments, the laser welding device is described as being capable of performing laser welding on the butted interface formed by abutting the respective ends of the plate material bent into a tubular shape and the lapped portion formed on the end portion on the connector portion side by squeezing the plate material bent into a tubular shape into a flat plate shape. However, the present disclosure is not limited to this configuration, and instead, for example, laser welding may be performed simultaneously on the butted interface and the lapped portion using two laser beams, for example by providing the laser welding device with two galvanometer scanners or two laser machining heads. With this configuration, the welding time can be shortened. Further, a deviation between the conveyance speeds of the pressing device and the laser welding device may be detected on the basis of the number of terminals of the chained terminal conveyed by the pressing device and the number of terminals of the chained terminal conveyed by the laser welding device instead of the sag amount. Furthermore, the image inspection may be performed on the butted portion before the laser welding. In the positioning mechanism, accurate positioning may be performed using a pinning mechanism or the like after rough conveyance. Moreover, a positioning pilot hole may be provided in the chained terminal in a part other than the carrier portions. Furthermore, the crimp terminal of the chained terminal may be positioned by the positioning mechanism using a laser measurement method. Further, in the positioning mechanism, positioning may be performed using a plurality of holes such as the holes in the carriers and the pilot holes described above. Moreover, the laser machining performance inspection device 40 may inspect the welding quality of the laser weld portion using a laser measuring device instead of a captured image.

Furthermore, in the above embodiments, the pressing device conveys a single chained terminal, but the present disclosure is not limited to the present embodiment, and in the terminal manufacturing apparatus according to the present disclosure, synchronization and positioning are likewise possible when a plurality of chained terminals are conveyed from the pressing device simultaneously. In other words, the processing time of the pressing device and the processing time of the welding device can be synchronized such that the separate pressing and laser welding processes can be connected smoothly.

What is claimed is:

1. A terminal manufacturing apparatus comprising:
a pressing device adapted to form a chained terminal including a crimp portion by bending a continuously supplied plate-shaped workpiece into a hollow shape, the crimp portion being crimpable with a conductor part of a coated conductor accommodated therein;
a welding device adapted to bring two edge portions of the crimp portion in proximity to each other and join the two edge portions by welding;
a conveying/positioning time calculating unit adapted to determine a conveying/positioning time of the welding device on the basis of a machining time required by the pressing device and the welding device; and
a conveying/positioning mechanism adapted to position the chained terminal in a welding machining position within the welding device in accordance with the conveying/positioning time.

2. The terminal manufacturing apparatus according to claim 1, wherein the machining time includes a pressing time required by the pressing device, a welding time required by the welding device, and a conveying/positioning time required to convey the chained terminal to the welding machining position in which welding is performed on the crimp portion, and to position the chained terminal in the position and release the chained terminal from the position, and
the conveying/positioning time calculating unit determines the conveying/positioning time such that the pressing time is equal to a sum of the welding time and the conveying/positioning time.

3. The terminal manufacturing apparatus according to claim 2, wherein a position detection sensor adapted to detect a sag amount of the conveyed chained terminal is provided on a conveyance path of the chained terminal between the pressing device and the welding device, and
the conveying/positioning time calculating unit corrects the conveying/positioning time in accordance with the sag amount.

4. The terminal manufacturing apparatus according to claim 3, wherein
the machining time further includes a standby time used in performing a time adjustment,
the position detection sensor detects a positional deviation of the chained terminal in a vertical direction from a reference position,
in a case where the chained terminal deviates upward from the reference position in the vertical direction, determining that the welding time is short, the conveying/positioning time calculating unit performs a process of lengthening the standby time, and
in a case where the chained terminal deviates downward from the reference position in the vertical direction, determining that the welding time is long, the conveying/positioning time calculating unit performs a process of shortening the standby time.

5. The terminal manufacturing apparatus according to claim 1, wherein the pressing time is calculated from a pressing interval, which is detected from a shot counter of the pressing device.

6. The terminal manufacturing apparatus according to claim 1, wherein a machining performance inspection device adapted to inspect a machining performance in relation to the welded crimp portion is provided integrally with the welding device or separately to the welding device on a downstream side thereof.

7. A terminal manufacturing apparatus comprising:
a pressing device adapted to form, on a continuously supplied plate-shaped workpiece, a butted portion between respective ends of a plate material bent to have a hollow cross-section and a lapped portion in which one end of the plate material is overlapped in planar form;
a welding device adapted to join the butted portion and the lapped portion by welding; and
a welding inspection device adapted to measure a bead width of the welded butted portion and lapped portion.

8. A terminal manufacturing apparatus comprising:
a pressing device adapted to form a chained terminal including a crimp portion by bending a continuously supplied plate-shaped workpiece into a hollow shape, the crimp portion being crimpable with a conductor part of a coated conductor accommodated therein;
a welding device adapted to bring two edge portions of the crimp portion in proximity to each other and join the two edge portions by welding;
a position detection sensor adapted to detect a sag amount of the chained terminal, the position detection sensor being provided on a conveyance path of the chained terminal between the pressing device and the welding device;
a positioning time adjusting unit adapted to adjust conveying/positioning time of the welding device in accordance with the sag amount; and
a conveying/positioning mechanism adapted to position the chained terminal in a welding machining position within the welding device in accordance with the conveying/positioning time.

* * * * *